United States Patent
Bar-Or Tillinger et al.

(10) Patent No.: US 12,132,600 B2
(45) Date of Patent: Oct. 29, 2024

(54) ADAPTATION OF AMPLITUDE AND PHASE SHIFT KEYING (APSK) MODULATION

(71) Applicant: QUALCOMM Incorporated, San Diego, CA (US)

(72) Inventors: Amit Bar-Or Tillinger, Tel-Aviv (IL); Assaf Touboul, Netanya (IL); Shay Landis, Hod Hasharon (IL); Idan Michael Horn, Hod Hasharon (IL); Michael Levitsky, Rehovot (IL); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 17/707,845

(22) Filed: Mar. 29, 2022

(65) Prior Publication Data

US 2023/0318900 A1    Oct. 5, 2023

(51) Int. Cl.
  *H04L 27/36* (2006.01)
  *H04L 27/34* (2006.01)
  *H04L 27/38* (2006.01)

(52) U.S. Cl.
  CPC .......... *H04L 27/36* (2013.01); *H04L 27/3405* (2013.01); *H04L 27/38* (2013.01)

(58) Field of Classification Search
  CPC ...... H04L 27/36; H04L 27/3405; H04L 27/38
  See application file for complete search history.

(56) References Cited

U.S. PATENT DOCUMENTS

| | | | |
|---|---|---|---|
| 2010/0068993 A1 | 3/2010 | Khan | |
| 2021/0377086 A1* | 12/2021 | Hussein | H04L 27/2064 |
| 2022/0400044 A1* | 12/2022 | Paz | H04L 5/0053 |

FOREIGN PATENT DOCUMENTS

| | | | |
|---|---|---|---|
| WO | WO-2008151308 A1 | 12/2008 | |
| WO | WO-2019091544 A1 * | 5/2019 | H04L 27/34 |
| WO | WO-2023032159 A1 * | 3/2023 | |

OTHER PUBLICATIONS

Dupak et al., Optimization of 16-APSK by Maximizing Mutual Information Criteria in SC-FDMA Communication Systems, Acta Electrotechnica et Informatica, vol. 14, No. 1, Apr. 2014, pp. 3-8 (Year: 2014).*

(Continued)

*Primary Examiner* — Freshteh N Aghdam
(74) *Attorney, Agent, or Firm* — Paul M. McAdams; Holland & Hart LLP

(57) ABSTRACT

This disclosure provides systems, methods, and apparatus, including computer programs encoded on computer-readable media, for determining a constellation configuration for an amplitude phase shift keying (APSK) modulation scheme. The constellation configuration may be based on communication impairment information that is indicative of at least one communication impairment expected to impair a single-carrier waveform communication. Examples of communication impairments may include additive white gaussian noise (AWGN), phase noise, non-linear distortion, or any combination thereof, among other examples. Examples of a constellation configuration may include a quantity of rings in a constellation pattern associated with the APSK modulation scheme, a quantity of constellation points associated the rings, a ring radius associated with one or more rings, a phase offset to one or more rings, and a mapping of data bits to one or more constellation points, among other examples.

32 Claims, 15 Drawing Sheets

(56) References Cited

OTHER PUBLICATIONS

Anedda, et al., "64-APSK Constellation and Mapping Optimization for Satellite Broadcasting using Genetic Algorithms", Mar. 2016, 9 pages.
Dupak D., et al., "Optimization of 16-APSK by Maximizing Mutual Information Criteria in SC-FDMA Communication Systems", Acta Electrotechnica et Informatica, [Online] vol. 14, No. 1, Apr. 1, 2014, pp. 3-8, XP093050667, SK, ISSN: 1335-8243, Title; Sections 3-5, figure 1, table 1.
International Search Report and Written Opinion—PCT/US2023/062365—ISA/EPO—Jun. 12, 2023 (2103330WO).

* cited by examiner

ADAPTATION OF AMPLITUDE AND PHASE SHIFT KEYING (APSK) MODULATION

INTRODUCTION

Aspects of the present disclosure relate generally to wireless communication and to adaptation of amplitude and phase shift keying (APSK) modulation for estimated communication impairments.

Wireless communication systems are widely deployed to provide various types of communication content such as voice, video, packet data, messaging, broadcast, and so on. Typical wireless communication systems may employ multiple-access technologies capable of supporting communication with multiple users by sharing available system resources (such as bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level.

An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. Some aspects of 5G NR may be based on the 4G Long Term Evolution (LTE) standard. NR is designed to provide a lower latency, a higher bandwidth or a higher throughput, and a higher reliability compared to 3G or LTE. An electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the extremely high frequency (EHF) band.

SUMMARY

The systems, methods, and devices of this disclosure each have several innovative aspects, no single one of which is solely responsible for the desirable attributes disclosed herein.

One innovative aspect of the subject matter described in this disclosure can be implemented as a first network node for wireless communication. The first network node may include a memory and at least one processor communicatively coupled to the memory. The at least one processor may be configured to determine, based on communication impairment information, a constellation configuration for an amplitude and phase shift keying (APSK) modulation scheme to be used for a transmission of a single-carrier waveform communication from the first network node to a second network node. The at least one processor may be configured to cause the transmission, based on the constellation configuration and the APSK modulation scheme, of the single-carrier waveform communication to the second network node.

Another innovative aspect of the subject matter described in this disclosure can be implemented as a first network node for wireless communication. The first network node may include a memory and at least one processor communicatively coupled to the memory. The at least one processor may be configured to determine, based on at least one communication impairment expected to impair a single-carrier waveform communication to be received from a second network node, a constellation configuration for an APSK modulation scheme that the second network node will use for a transmission of the single-carrier waveform communication. The at least one processor may be configured to output the constellation configuration in a control message to the second network node. The at least one processor may be configured to cause reception, based on the constellation configuration, of the transmission of the single-carrier waveform communication from the second network node.

Another innovative aspect of the subject matter described in this disclosure can be implemented as a method performed by a first network node for wireless communication. The method may include determining, based on communication impairment information, a constellation configuration for an APSK modulation scheme to be used for a transmission of a single-carrier waveform communication from the first network node to a second network node. The method may include causing the transmission, using the constellation configuration and the APSK modulation scheme, of the single-carrier waveform communication to the second network node.

Another innovative aspect of the subject matter described in this disclosure can be implemented as a method performed by a first network node for wireless communication. The method may include determining, based on at least one communication impairment expected to impair a single-carrier waveform communication to be received from a second network node, a constellation configuration for an APSK modulation scheme that the second network node will use for a transmission of the single-carrier waveform communication. The method may include transmitting the constellation configuration to the second network node. The method may include receiving, using the constellation configuration, the transmission of the single-carrier waveform communication from the second network node.

Aspects of the subject matter described in this disclosure can be implemented in an apparatus, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
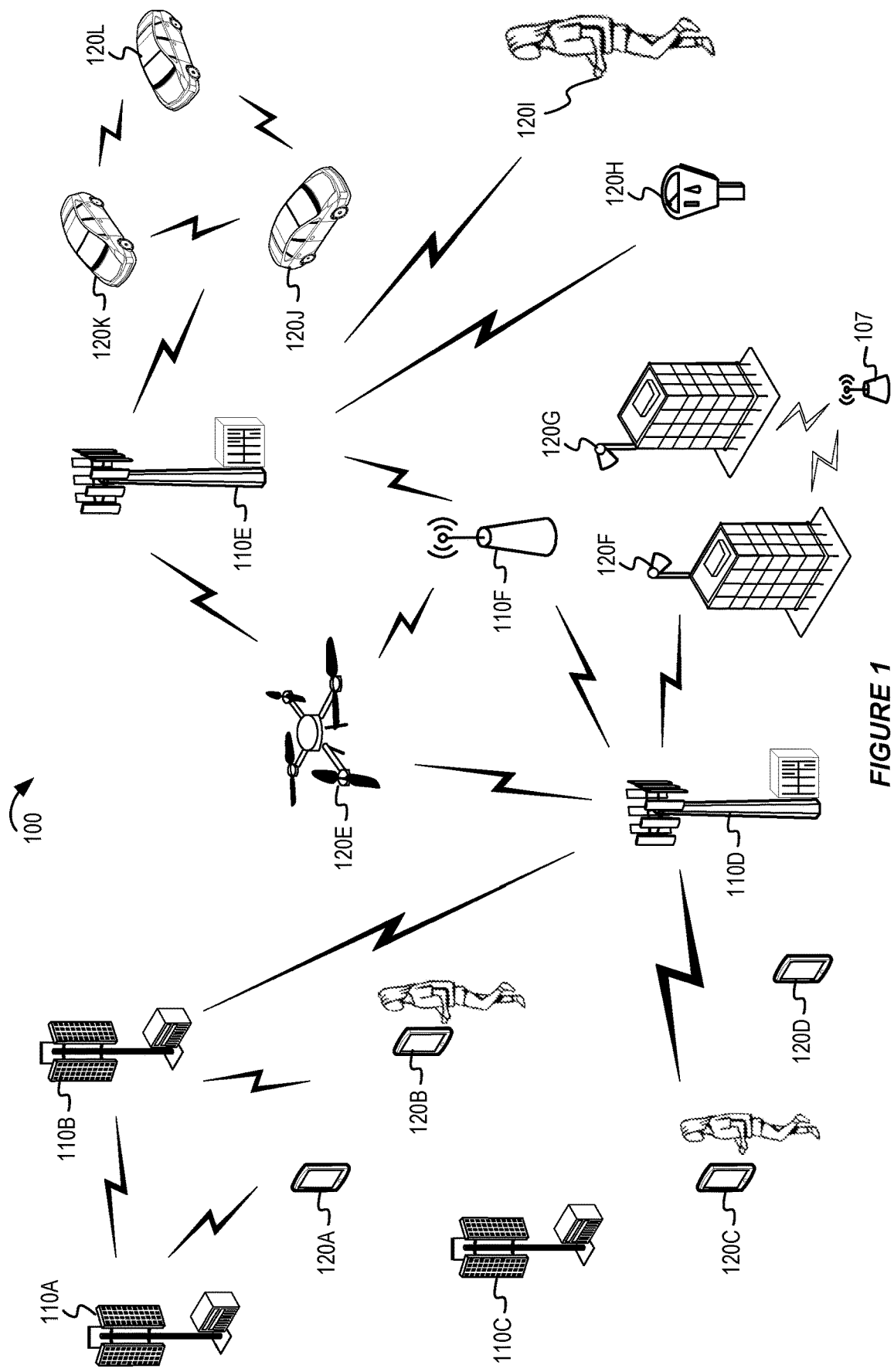
FIG. 1 is a system diagram of an example wireless communication network.

The following description is directed to some particular implementations for the purposes of describing innovative aspects of this disclosure. The teachings herein can be applied in a multitude of different ways. The described implementations can be implemented in any apparatus, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), including technologies that employ code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) or multi-user (MU) MIMO. The examples in this disclosure are related to single-carrier waveform communication. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

A wireless communication network (such as a WWAN) may utilize a modulation scheme (such as one of a plurality of predefined an amplitude phase shift keying (APSK) modulation schemes) to communicate a single-carrier waveform communication between a first network node and a second network node. Each APSK modulation scheme may define a quantity of constellation points such that each respective constellation point (sometimes also referred to as a symbol) is associated with a respective sequence of data bits. In some instances, APSK modulation schemes may have a lower peak to average power ratio (PAPR) compared to quadrature amplitude modulation (QAM) modulation schemes, making APSK modulation schemes desirable in some wireless communication systems. However, when communicated using a particular APSK modulation scheme, a single-carrier waveform communication may be susceptible to communication impairments. Examples of communication impairments may include additive white gaussian noise (AWGN), phase noise, or non-linear distortion, among other examples. The communication impairments can reduce the effectiveness of an APSK modulation scheme, particularly in high-frequency bands.

Various aspects of this disclosure relate generally to determining a constellation configuration for the APSK modulation scheme to be used for a transmission and reception of a single-carrier waveform communication. The constellation configuration may be based on a communication impairment information that is indicative of at least one communication impairment expected to impair the single-carrier waveform communication. Using the techniques of this disclosure, the constellation configuration may be selected or generated to maximize the channel capacity taking into account the communication impairments. In some aspects, the PAPR of the adapted APSK modulation scheme may be less than that of the original APSK modulation scheme before adaptation. This specification may refer to "adapting" an APSK modulation scheme, which may refer, interchangeably, to either selecting a constellation configuration from a set of predefined constellation configurations or dynamically generating the constellation configuration. In some aspects, the constellation configuration may include a constellation pattern, such as a quantity of rings associated with the APSK modulation scheme or a quantity of constellation points associated with each of the rings.

Additionally, or alternatively, in some aspects the constellation configuration may include a constellation parameter that defines a ring radius associated with one or more rings or a phase offset to one or more rings. In some aspects, the constellation configuration may include a mapping of data bits to one or more constellation points.

In some aspects, a first network node may select the constellation parameters based on control information from a second network node. For example, the control information may include feedback that indicates measured or estimated communication impairments detected by the second network node. The feedback may enable the first network node to determine the constellation configuration for the APSK modulation scheme. After determining the constellation configuration, the first network node may transmit control information to the second network node to indicate the constellation configuration that will be used for the single-carrier waveform communication. Alternatively, or additionally, the second network node may send control information that indicates a constellation configuration (or at least one proposed adaptation) determined by the second network node based on one or more communication impairments it has detected. In various aspects, the control information (from the first network node or the second network node) may be included in a downlink control information (DCI) message, an uplink control information (UCI) message, a medium access control (MAC) control element (MAC-CE), or a radio resource control (RRC) message between the first and second network nodes.

In some aspects, the constellation configuration may be based on the type of communication impairment. For example, when the communication impairment is primarily due to phase noise (and relatively low AWGN and nonlinearity distortion), the first network node or the second network node may select a constellation configuration in which the APSK modulation scheme has fewer constellation points per ring and a higher quantity of rings because such constellation parameter may allow better separation between constellation points under angular distortion. Similarly, when the communication impairment primarily is primarily due to AWGN, the first network node or the second network node may select a different constellation configuration suited for the communication impairment. In some aspects, the first network node may select a constellation configuration from among a set of different constellation configurations, each of which are associated with different combinations of potential communication impairments.

In some implementations, a first network node may transmit an impairment estimation signal to the second network node to aid in determining one or more communication impairments. The second network node may measure the communication impairments associated with receiving the impairment estimation signal. The second network node may respond with a feedback message in response to the impairment estimation signal. In various aspects, the feedback message may include communication impairment information, such as measurement data associated with the impairment estimation signal, one or more communication impairments detected while receiving the impairment estimation signal, a constellation configuration selected by the second network node based on the one or more communication impairments, or any combination thereof. In some aspects, the feedback message may be formatted as a control message, such as a DCI or UCI message. Thus, the constellation configuration for the APSK modulation scheme may be determined based on the communication channel as well as communication impairments that impair the second network node's reception of the impairment estimation signal. For example, the communication impairment information may take into account the signal-to-noise ratio (SNR) or the signal-to-interference-plus-noise ratio (SINR), among other examples. In some aspects, the communication impairment information may take into account for any compensation capabilities (such as digital post distortion (DPoD)) at the second network node.

Once the constellation configuration has been determined (by either the first network node or the second network node) and communicated so that both network nodes are aware of the constellation configuration, the first network node may cause a transmission of the single-carrier waveform communication, using the constellation configuration, to the second communication. In some aspects, to cause transmission of the single-carrier waveform communication to the second network node, the first network node may be configured to transmit the single-carrier waveform communication to the second network node.

In some aspects, the constellation configuration for the APSK modulation scheme may be associated with at least one type of communication impairment. In such aspects, the association between the constellation configuration and the at least one type of communication impairment may be a specific association, optimized association, or the like. For example, a first constellation configuration may be associated with a first type of communication impairment because the first constellation configuration is adapted for, optimized for, specific to, or is otherwise associated with the first type of communication impairment. As another example, a second constellation configuration may be associated with a second type of communication impairment because the second constellation configuration is adapted for, optimized for, specific to, or is otherwise associated with the second type of communication impairment.

Particular implementations of the subject matter described in this disclosure can be implemented to realize one or more of the following potential advantages. A constellation configuration for an APSK modulation scheme can be optimized for a single-carrier waveform communication based on the channel conditions and receiver processing. Thus, the constellation configuration can be fine-tuned based on communication impairments that are expected to impact the single-carrier waveform communication. Throughput and resiliency may be improved by reducing error rates in transmission that would otherwise use less optimal constellation configuration. The use of an impairment estimation signal and feedback to determine an optimal constellation configuration may preserve airtime resources and increase effectiveness of the APSK modulation scheme. The control information and information elements described in this disclosure may support efficient communication of communication impairment information, receiver capabilities, a proposed constellation configuration, and/or a selected constellation configuration, among other examples. As a result of adapting the APSK modulation scheme, the overall power consumption may be reduced (such as reducing airtime) and maximum throughput may be increased.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used. Although not shown for simplicity, BSs (such as BS 110) may refer to both monolithic BSs, as well as disaggregated BSs, such as those with disaggregated RAN (D-RAN) or open RAN (O-RAN) architectures, which may include one or more disaggregated constituent components, such as a central unit (CU), distributed unit (DU), and a radio unit (RU).

ABS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a network node, a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may communication information using single-carrier waveform communication. Examples of single-carrier waveform communication include single-carrier frequency-division multiple access (SC-FDMA) or single-carrier OFDM (SC-OFDM), among other examples. SC-FDMA also may be referred to as linearly precoded OFDM (LP-OFDM), in the sense that it has an additional discrete Fourier transform (DFT) processing step preceding the conventional OFDMA processing. In the transmission processing of SC-FDMA, for each user, the sequence of bits transmitted is mapped to a complex constellation of symbols. Then different transmitters (corresponding to different users) are assigned different Fourier coefficients. This assignment is implemented in mapping and demapping blocks of the transmitter and receiver, respectively. The receiver side includes one demapping block, one inverse discrete Fourier transform (IDFT) block, and one detection block for each user signal to be received.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
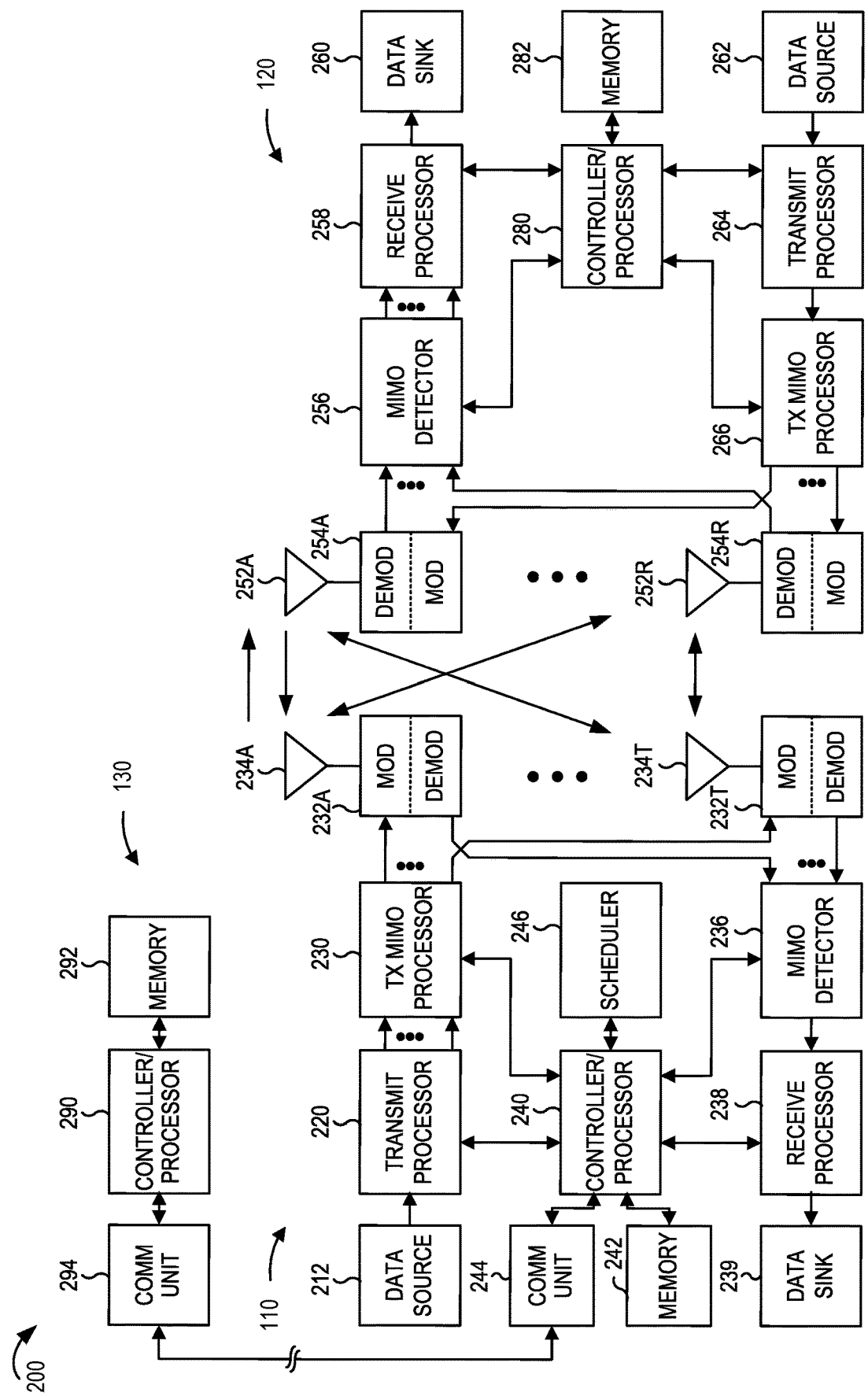
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for single-carrier waveform communication, OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for single-carrier waveform communication, OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with implementing adaptation of APSK modulation, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 1100 of FIG. 11, the process depicted by flowchart 1200 of FIG. 12, or other processes as described herein. The memories 242 and 282 may store data and program codes for BS 110 and UE 120, respectively. A scheduler 246 may schedule UEs for data transmission on the downlink, the uplink, or a combination thereof.

Figure 11:
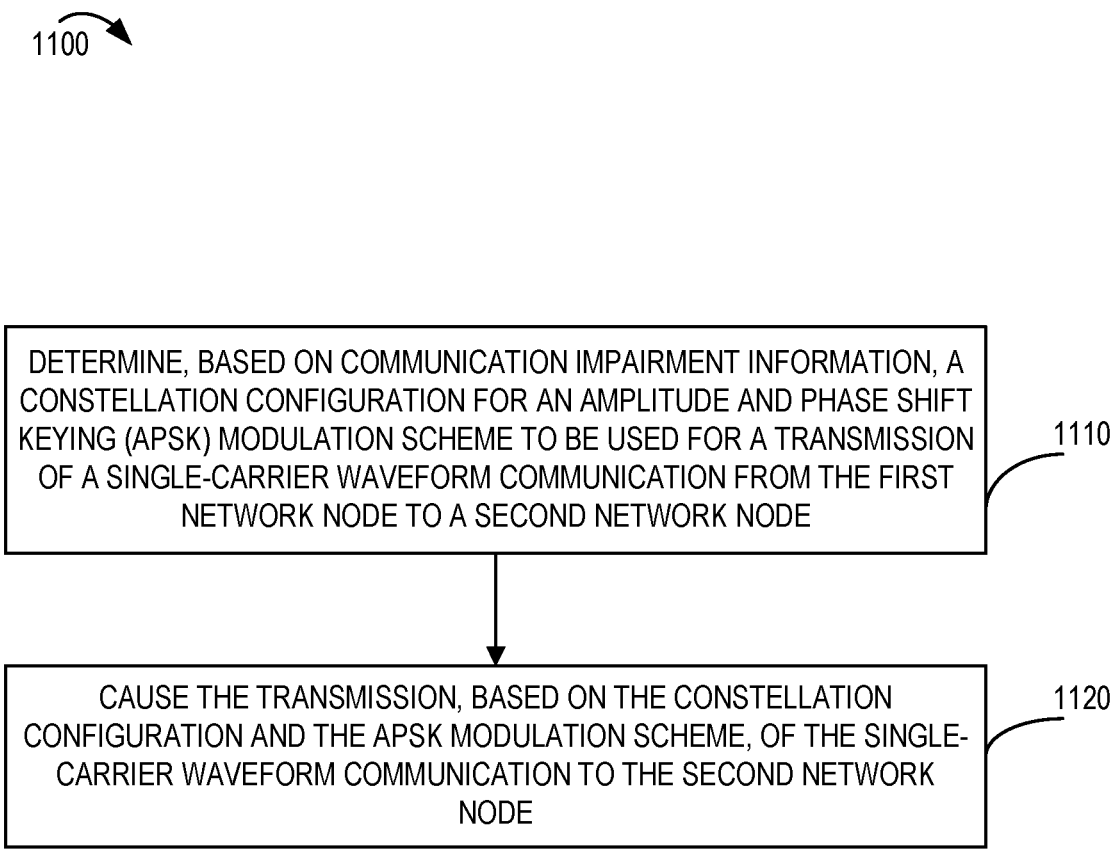
FIG. 11 shows a flowchart illustrating an example process for wireless communication between a first network node and a second network node.
Figure 12:
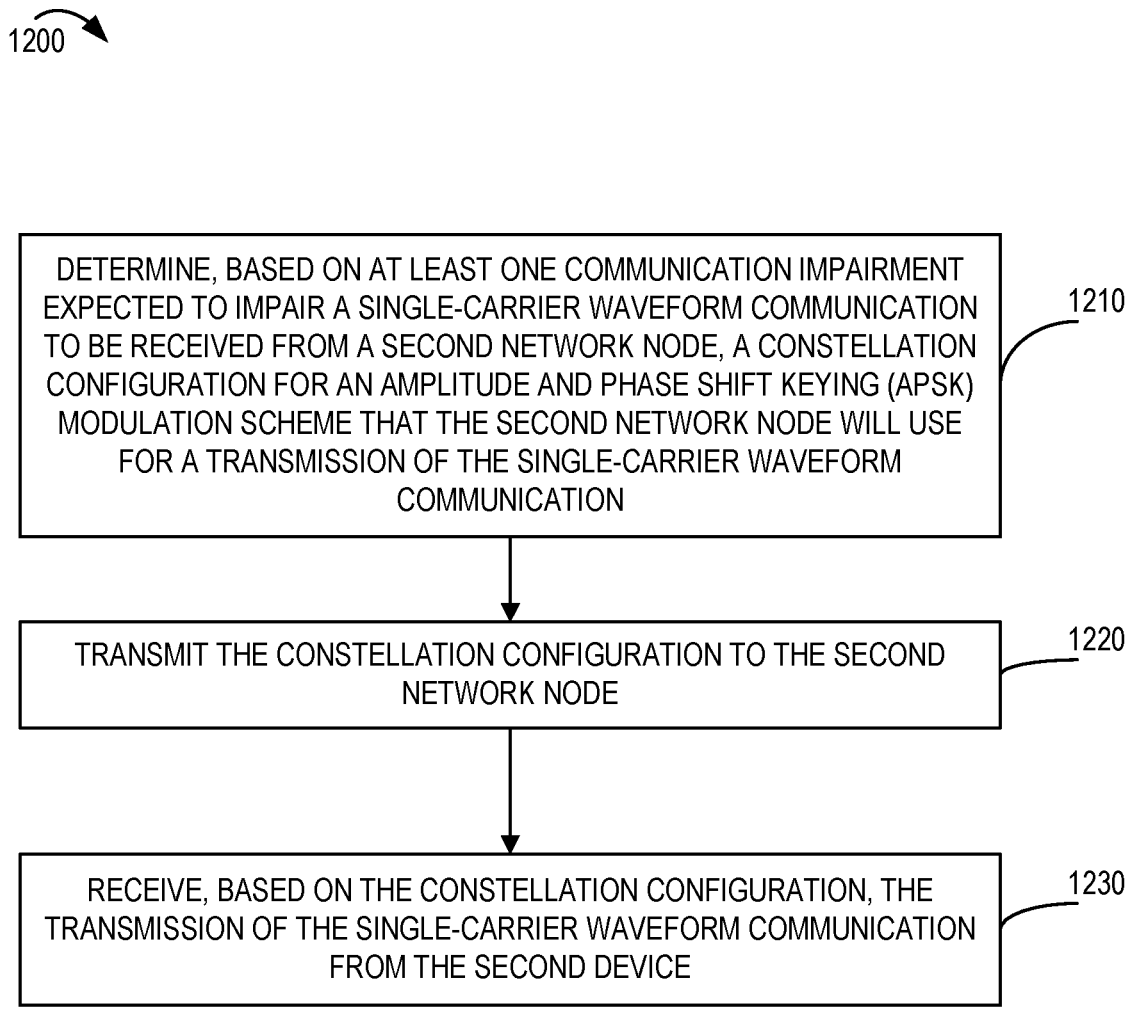
FIG. 12 shows a flowchart illustrating another example process for wireless communication between a first network node and a second network node.

The stored program codes, when executed by the controller/processor 280 or other processors and modules at UE 120, may cause the UE 120 to perform or direct operations of, for example, the process depicted by flowchart 1100 of FIG. 11, the process depicted by flowchart 1200 of FIG. 12, or other processes as described herein. The stored program codes, when executed by the controller/processor 240 or other processors and modules at BS 110, may cause the BS 110 to perform or direct operations of, for example, the process depicted by flowchart 1100 of FIG. 11, the process depicted by flowchart 1200 of FIG. 12, or other processes as described herein. A scheduler 246 may schedule UEs for data transmission on the downlink, the uplink, or a combination thereof.

In some aspects, UE 120 may include means for performing or directing operations of, for example, the process depicted by flowchart 1100 of FIG. 11, the process depicted by flowchart 1200 of FIG. 12, or other processes as described herein. In some aspects, such means may include one or more components of UE 120 described in connection with FIG. 2.

In some aspects, BS 110 may include means for performing or directing operations of, for example, the process depicted by flowchart 1100 of FIG. 11, the process depicted by flowchart 1200 of FIG. 12, or other processes as described herein. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
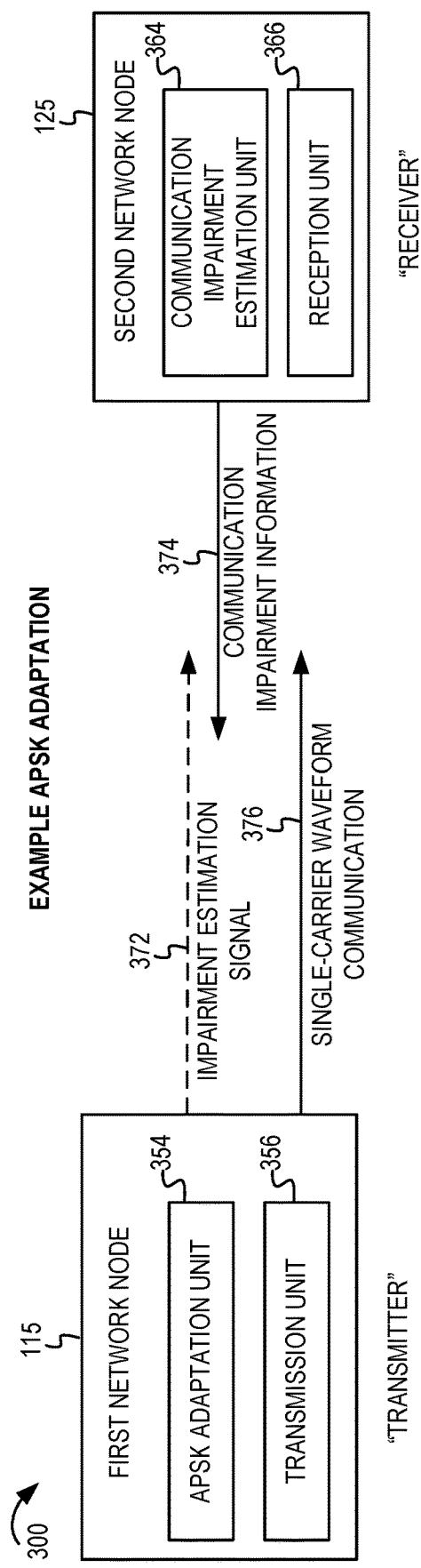
FIG. 3 shows a system diagram of an example wireless communication network including a first network node and a second network node that support adaptation of an amplitude phase shift keying (APSK) modulation scheme.

FIG. 3 shows a system diagram of an example wireless communication network 300 including a first network node and a second network node that support adaptation of an APSK modulation scheme. A first network node 115 may be referred to a "transmitter" because it has a single-carrier waveform communication 376 to communicate to the second network node 125 which may be referred to as a "receiver." In some implementations (such as for DL communication), the first network node 115 may be a BS (such as a gNB) and the second network node 125 may be a UE. In some other implementations (such as for UL communication), the first network node 115 may be a UE and the second network node 125 may be a BS (such as a gNB). In yet other implementations, the first network node 115 and the second network node 125 may be radio units (RUs) in a disaggregated RAN architecture, sidelink devices, relays, or repeaters, among other examples. For clarity, the description of FIG. 3 may refer the first network node 115 as the transmitter and the second network node 125 as the receiver.

The first network node 115 may include an APSK adaptation unit 354 and a transmission unit 356. The APSK adaptation unit 354 may be configured to select an APSK modulation scheme and determine a constellation configuration for the APSK modulation scheme in accordance with aspects of this disclosure. The constellation configuration may refer to a constellation pattern, a constellation parameter, or a constellation mapping, among other examples. A constellation pattern may indicate a number of rings, how many points on each ring, or both, among other examples. A constellation parameter may indicate a ring radius, a phase offset (sometimes referred to as angular rotation), or both, among other examples. The transmission unit 356 may be configured to transmit a single-carrier waveform communication 376 to the second network node 125.

The second network node 125 may include a communication impairment estimation unit 364 and a reception unit 366. The communication impairment estimation unit 364 may be configured to determine one or more communication impairments expected to impair a single-waveform communication in accordance with aspects of this disclosure. The reception unit 366 may be configured to receive the single-carrier waveform communication 376 from the first network node 115.

To enable the APSK adaptation unit 354 to determine an optimal constellation configuration, the second network node 125 may transmit communication impairment information 374 indicative of the communication impairment expected to impair the single-carrier waveform communication 376. The communication impairment information may be determined by the communication impairment estimation unit 364. In some implementations, the communication impairment information may be based on measurements of an impairment estimation signal 372 transmitted from the first network node 115 to the second network node 125 prior to the single-carrier waveform communication 376. The communication impairment estimation unit 364 may process the impairment estimation signal 372 to determine the estimated communication impairment. As described herein, the estimated communication impairment may include any combination of AWGN, phase noise, or non-linear distortion, among other examples.

In some implementations, the communication impairment information 374 is included in a control message or a feedback message from the second network node 125 to the first network node 115. For example, the communication impairment information 374 in an uplink control information (UCI) message, a downlink control information (DCI) message, a MAC-CE, or an RRC message. In the example of FIG. 3, the first network node 115 may be a gNB preparing a downlink communication to a UE (such as the second network node 125). In that scenario, the communication impairment information 374 may be included in an UCI message. In a scenario in which the first network node 115 is a UE preparing an uplink communication to a gNB (such as the second network node 125), the communication impairment information 374 may be included in a DCI message.

In some implementations, the communication impairment information 374 may indicate the expected communication impairment, such as values indicating AWGN, PN, nonlinear distortion, or any combination thereof. In some implementations, the communication impairment information 374 may indicate a constellation configuration selected by the second network node 125 based on the expected communication impairment. For example, the second network node 125 may include an APSK adaptation unit (not shown) that performs part or all of the functionality described with reference to the APSK adaptation unit 354 of the first network node 115.

The APSK adaptation unit 354 may determine a constellation configuration for an APSK modulation scheme based on the estimated communication impairment. For example, the APSK adaptation unit 354 may select a constellation pattern or one or more constellation parameters of the constellation pattern for a selected APSK modulation scheme. A constellation pattern may define a quantity of rings, a quantity of constellation points associated with each ring, or both. A constellation parameter may define a ring radius associated with one or more rings of the constellation pattern, a phase offset to one or more rings, or both. In some implementations, the constellation parameters selected by the APSK adaptation unit 354 may adjust the constellation pattern. In some implementations, the constellation configuration may define a mapping of data bits to one or more constellation points associated with the constellation pattern.

In some implementations, the APSK adaptation unit 354 may select a constellation configuration from among a set of different constellation configurations. For example, each constellation configuration in the set of constellation configurations may be associated with a different combination of potential communication impairments. The set of different constellation configurations may be associated with a lookup table or reference database such that the APSK adaptation unit 354 can quickly determine an optimal constellation configuration for a particular combination of expected communication impairments. In some implementations, the entries in the lookup table or reference database may be associated with values such that a particular value refers to a particular entry.

In some implementations, the first network node 115 may transmit an indication (not shown) of the constellation configuration to the second network node 125 prior to transmitting the single-carrier waveform communication 376. The indication of the constellation configuration may be included in a control message (not shown). In some implementations, the indication may refer to a value in a lookup table or reference database that defines various constellation configurations adapted for various estimated communication impairments. In the case of DL communication, the indication may be included in a DCI, MAC-CE, or RRC message. In the case of UL communication, the indication may be included in a UCI, MAC-CE, or RRC message. In some implementations, a new information element (not previously defined in a technical standard specification) may be defined to carry the communication impairment information 374 (from the second network node 125 to the first network node 115) or the indication (not shown, from the first network node 115 to the second network node 125) of the selected constellation configuration.

Figure 4:
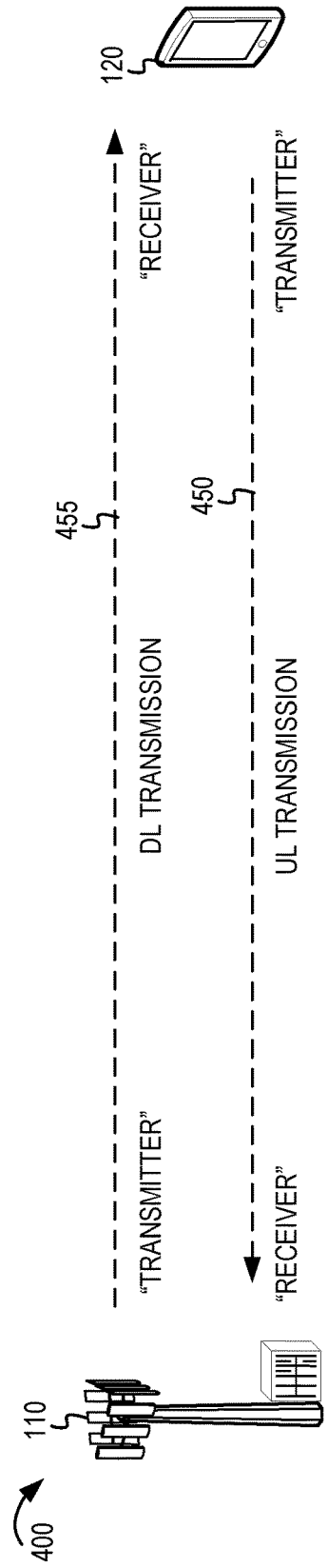
FIG. 4 shows a conceptual diagram in which a BS and a UE may alternatively behave as transmitter and receiver of uplink (UL) and downlink (DL) communication in an example wireless communication network.

FIG. 4 shows a conceptual diagram 400 in which a BS and a UE may alternatively behave as transmitter and receiver of UL and DL communication in an example wireless communication network. In one scenario, the BS 110 may transmit an DL transmission 455 of a single-carrier waveform communication to the UE 120. In this case, the BS 110 may be referred to as the "transmitter" (such as the first network node 115 described with reference to FIG. 3) and the UE 120 may be referred to as the "receiver" (such as the second network node 115 described with reference to FIG. 3). In another scenario, a BS 110 may receive an UL transmission 450 of a single-carrier waveform communication from a UE 120. In this case, the BS 110 may be referred to as the "receiver" (such as the second network node 125 described with reference to FIG. 3) and the UE 120 may be referred to as the "transmitter" (such as the first network node 115 described with reference to FIG. 3).

In the scenario for the DL communication, the UE 120 may determine communication impairments expected to impair a single-carrier waveform communication based on an impairment estimation signal from the BS 110. In some implementations (referred to as a "first option" or "feedback model"), the UE 120 may report the expected communication impairments as communication impairment information to the BS 110. The BS 110 may use the communication impairment information to select a constellation configuration for the APSK modulation. In some implementations (referred to as a "second option" or "non-feedback model"), the UE 120 may use the communication impairment information to select a suggested constellation configuration for the APSK modulation. The UE 120 may transmit communication impairment information indicating the suggested constellation configuration to the BS 110. The BS 110 may use the constellation configuration for the DL transmission 455 based on the constellation configuration determined by the UE 120.

In the scenario for the UL communication, the BS 110 may determine communication impairment information based on an impairment estimation signal (or, alternatively, any previous communication) from the UE 120. In some implementations (referred to as a "second option" or "non-feedback model"), the BS 110 may use the communication impairment information to select a constellation configuration for the APSK modulation. The BS 110 may transmit control information indicating the constellation configuration to the UE 120. The UE 120 may be configured to use the indicated constellation configuration for the UL transmission 450. In some implementations (referred to as a "first option" or "feedback model"), the BS 110 may report the communication impairment information to the UE 120. The UE 120 may use the communication impairment information to select the constellation configuration for the APSK modulation.

The first option (feedback model) and the second option (non-feedback model) differ with regard to which network node determines the constellation configuration for the APSK modulation. In the first option, the transmitter selects the constellation configuration based on feedback information. In the second option, the receiver selects the constellation configuration based on its own measurements and then transmits control information to the transmitter to indicate the constellation configuration selected by the receiver.

Figure 5:
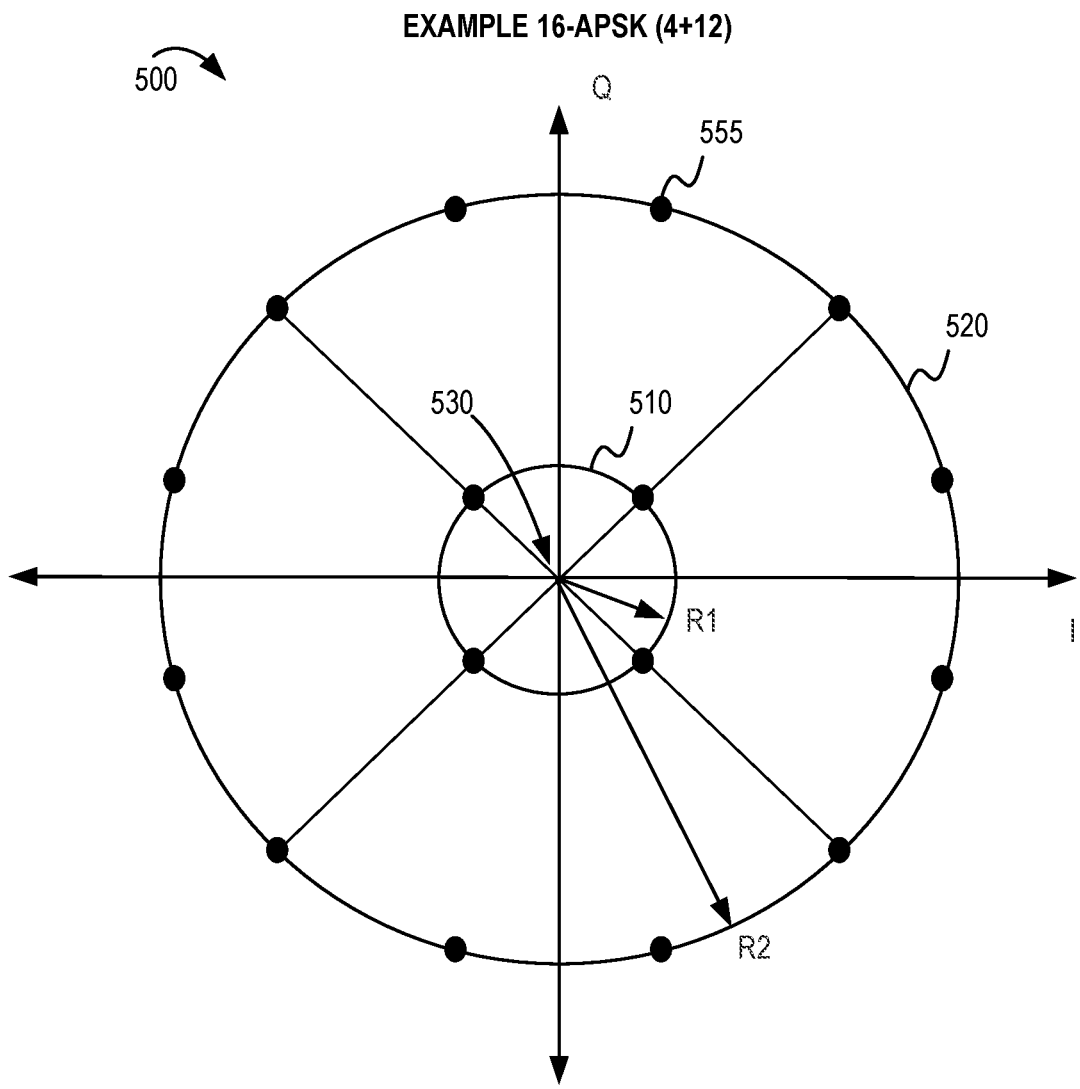
FIG. 5 shows a conceptual diagram of an example APSK modulation scheme with sixteen constellation points.

FIG. 5 shows a conceptual diagram 500 of an example APSK modulation scheme with sixteen constellation points. The example APSK modulation scheme described with reference to FIG. 5 may be referred to as 16-APSK with a 4+12 ring configuration, indicating 4 constellation points in a first ring 510 and 12 constellation points in a second ring 520. Each constellation point (shown as black dots, such as constellation point 555) refer to a particular phase (I) and quadrature (Q) relative to a reference carrier frequency (such as a frequency associated with a center 530 of the constellation pattern. The term "I/Q" is an abbreviation for "in-phase" and "quadrature." The phase (I) and quadrature (Q) are relative to an established reference point (such as the center 530 of the constellation pattern). In some implementations, the I and Q refer to two sinusoids (such as a cosine waveform for the I and a sine waveform for the Q) that have the same frequency and are 90° out of phase. A signal at a particular constellation point (associated with a particular phase and quadrature) can represent a quantity of bits. In the example of 16-APSK, each constellation point may be associated with 4 bits.

The 16-APSK modulation scheme described with reference to FIG. 5 includes a first ring 510 (with 4 constellation points) having a first radius R1 and a second ring 520 (with 12 constellation points) having a second ring radius R2. Traditionally, the size of the first radius R1 and the second radius R2, as well as a mapping of bits to each constellation point, may be predetermined or predefined in a technical standard specification. In accordance with aspects of this disclosure, the first radius R1, the second radius R2, a phase offset (also referred to as an angular offset), or any combination thereof, may be adapted based on estimated communication impairments, such as those described further with reference to FIG. 7.

The 16-APSK (4+12) configuration described with reference to FIG. 5 is only one of a variety of APSK modulation schemes. Other examples may include 16-APSK (8+8), 32-APSK (4+12+16), 64-APSK (8+16+20+20), 64-APSK (16+16+16+16), 64-APSK (4+12+20+28), and various configurations of 256-APSK. The APSK modulation scheme may refer to a standard constellation pattern. In various aspects of this disclosure, the constellation configuration (such as quantity of rings, quantity of constellation points, ring radius, phase offset) may be adapted to form different constellation patterns in I/Q.

Figure 6:
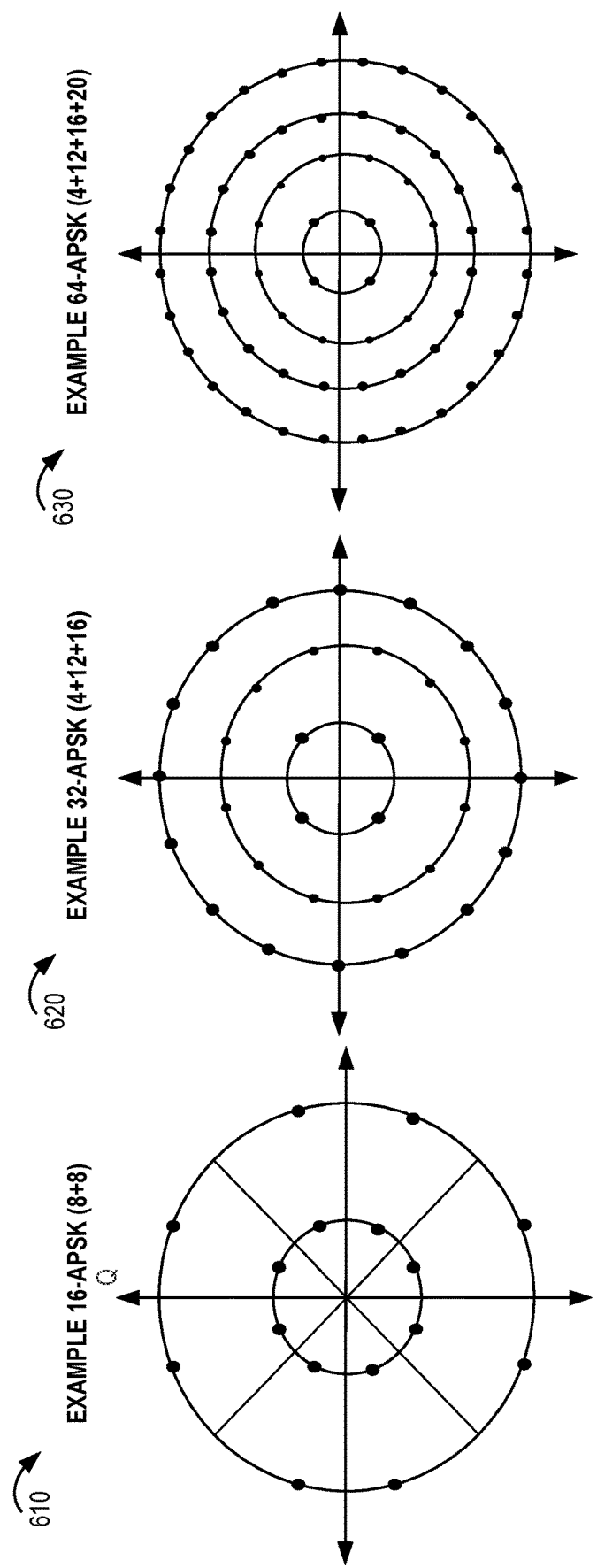
FIG. 6 shows conceptual diagrams of other example APSK modulation schemes.

FIG. 6 shows conceptual diagrams of other example APSK modulation schemes. A first example 610 shows an APSK modulation scheme that includes two rings with eight constellation points each. The first example 610 may be referred to as 16-APSK (8+8). A second example 620 shows an APSK modulation scheme that includes three rings with four constellation points in a first ring, twelve constellation points in a second ring, and sixteen constellation points in a third ring. The second example 610 may be referred to as 32-APSK (4+12+16). A third example 630 shows an APSK modulation scheme that includes four rings with four constellation points in a first ring, twelve constellation points in a second ring, sixteen constellation points in a third ring, and twenty constellation points in a fourth ring. The third example 630 may be referred to as 64-APSK (4+12+16+20).

As the quantity of rings or quantity of constellation points per ring increases, the constellation point may be more susceptible to communication impairments. Typically, a greater distance between constellation points enables for more robust transmission while a smaller distance between constellation points may reduce reliability of transmission. However, more constellation points enable a higher data transmission rate compared to APSK modulation schemes that include fewer constellation points. This is because the bit-to-symbol mapping of constellation points depends on the quantity of constellation points in the APSK modulation scheme.

Figure 7:
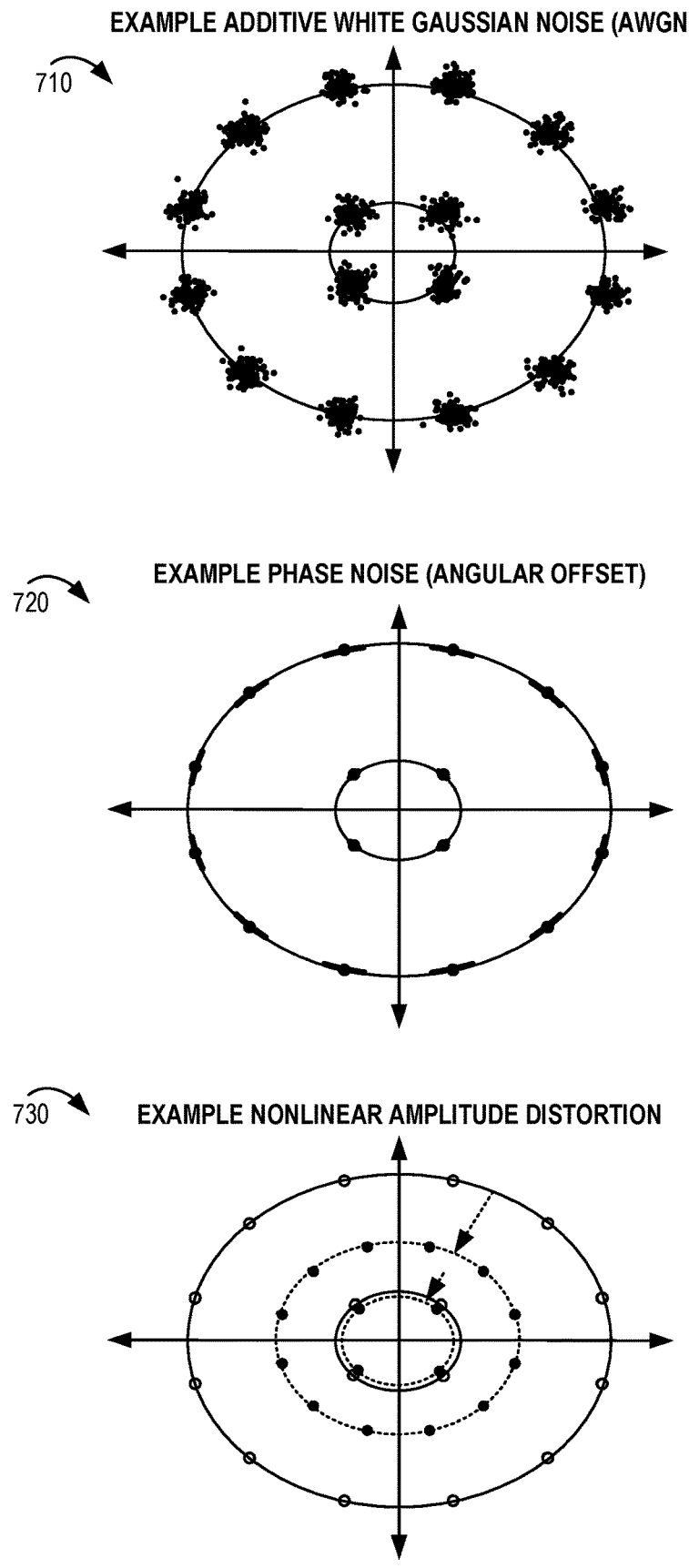
FIG. 7 shows conceptual diagrams of example communication impairments to an example APSK modulation scheme.

FIG. 7 shows conceptual diagrams of example communication impairments to an example APSK modulation scheme. The example communication impairments are not intended as an exhaustive list, but rather are provided for pedagogical purposes of explaining example communication impairments.

A first example communication impairment 710 may be based on AWGN. AWGN may be additive and omnidirectional such that the impairment associated with AWGN may be non-uniform. Each transmitted symbol (at a constellation point) may be affected by random signals or other noise that causes a signal at an intended constellation point to vary from the intended I/Q location in the constellation pattern. AWGN may come from many natural noise sources, such as the thermal vibrations of atoms in conductors, shot noise, black-body radiation from the earth, or from celestial sources (such as the sun).

A second example communication impairment 720 may be based on phase noise (PN). PN may be multiplicative and angular. PN may cause random fluctuations in the phase of a waveform. Each transmitted symbol (at a constellation point) may be affected by phase fluctuations or jitter that causes a signal at an intended constellation point to vary in a phase rotation from the intended I/Q location in the constellation pattern.

A third example communication impairment 730 may be based on nonlinear distortion (sometimes also referred to as nonlinearity). In nonlinear distortion, tach transmitted symbol (at a constellation point) may be affected by amplitude or distortion that causes a signal at an intended constellation point to vary in ring radius from the intended I/Q location in the constellation pattern. The nonlinearity is caused by distortion at the transmitter. A simple model of this distortion is AM/AM (amplitude to amplitude) in which the distortion is dependent with the amplitude of the signal, and affects the amplitude of the signal.

Each of the example communication impairments can impair a receiver's capability to determine the accurate intended constellation point for a signal in different ways. Furthermore, multiple communication impairments may impair a single-carrier waveform communication concurrently and to different degrees of impairment. For example, an estimated communication impairment may predominantly be based on PN while also experiencing AWGN, nonlinear distortion, or both, to a smaller degree. In various aspects of this disclosure, the constellation parameters may be selected to adapt an APSK modulation scheme based on one or more estimated communication impairments.

Some receivers may be capable of correcting for some degree of the communication impairments. For example, digital post distortion (DPoD) refers to a capability of a receiver to digitally adjust received signals to account for some types of communication impairments. In some implementations, a receiver can communicate the estimated communication impairments that remain after DPoD or may communicate DPoD capability information that can be taken into account when selecting constellation parameters based on estimated communication impairments.

Figure 8A:
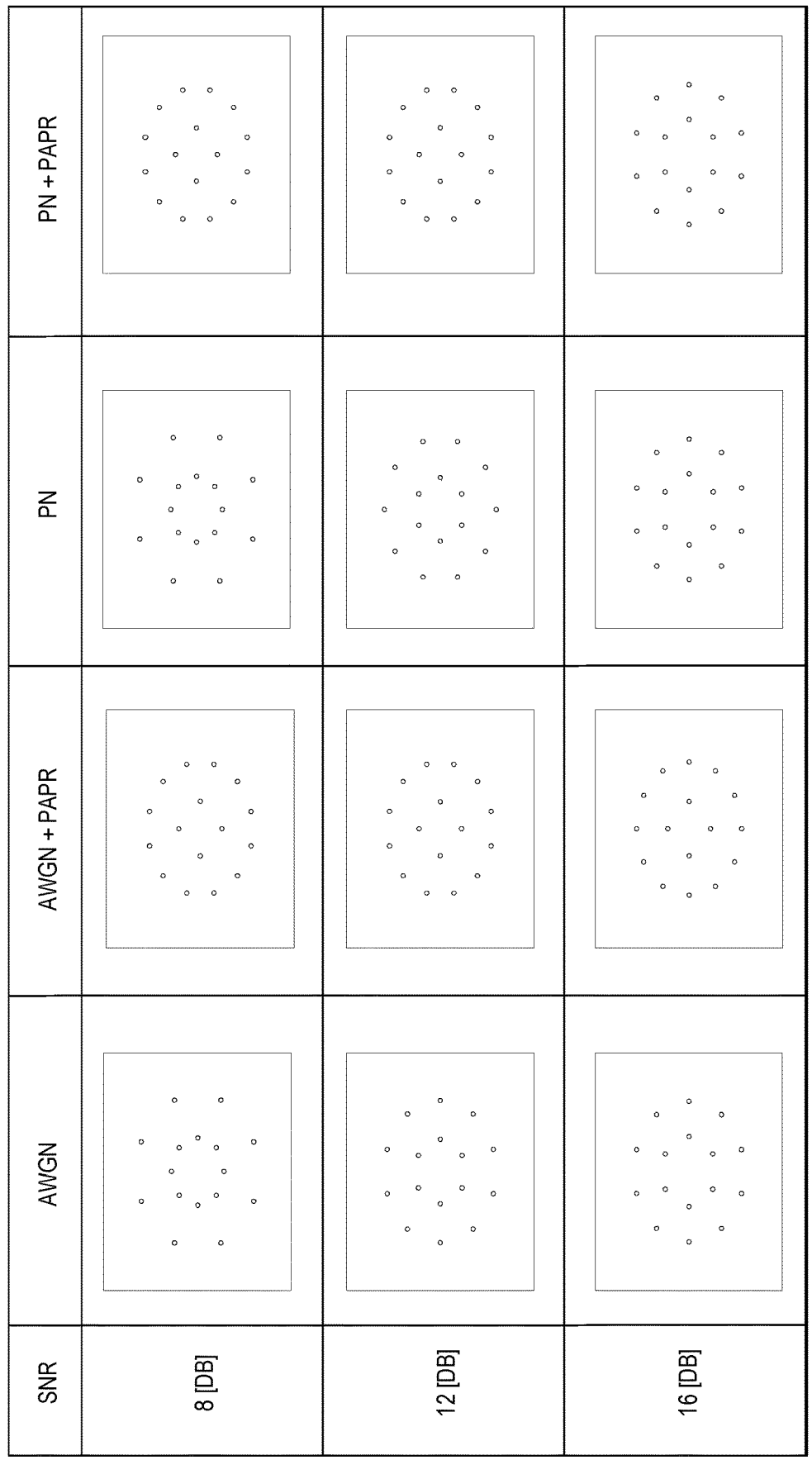
FIG. 8A shows example constellation configurations for a 16-APSK modulation scheme associated with different communication impairments.

FIG. 8A shows example constellation configurations 800 for a 16-APSK modulation scheme associated with different estimated communication impairments. The example constellation configurations 800 show how a constellation pattern or constellation parameter, or both, may be adapted for AWGN or PN and for different SNRs. For example, in the presences of PN as the dominant communication impairment, the constellation parameters may indicate fewer constellation points per radius and larger quantity of rings. In this instance, a 16-APSK (4+12) may be preferable over a 16-APSK (8+8). If the 16-APSK (8+8) modulation scheme has been selected, a transmitter may indicate an adaption to the APSK modulation scheme to use a constellation configuration more like the 16-APSK (4+12) modulation scheme. Alternatively, the transmitter may increase a ring radius of the first ring to support a greater phase variation between the constellation points in the first ring.

In a scenario with AWGN, a greater distance between constellation points may mitigate the impairment associated with AWGN. A transmitter may select a constellation configuration that adjusts (such as increases) the ring radiuses of one or more rings or adjusts (such as decreases) the quantity of constellation points in one or more rings. In the scenario with nonlinear distortion, a transmitter may select constellation parameters that adjust (such as increase) the ring radiuses of one or more rings or adjust (such as increase) the quantity of constellation points in one or more rings.

In some implementations, the constellation configuration selected by a network node may be selected from among a set of constellation configurations. Each constellation configuration in the set of constellation configurations may include a constellation pattern or constellation parameter that take into account a particular combination of communication impairments. In some aspects, the set of constellation configurations may be determined by modeling or a programmatic algorithm. In some aspects, the modeling also may take into account various amounts of SNR (or SINR). In some aspects, the modeling may optimize for PAPR or reception effectiveness, or both. The example constellation configurations 800 shown in FIG. 8A are provided as examples of how a constellation pattern may be adjusted by modifying one or more constellation parameters or constellation patterns based on expected communication impairments.

In some implementations, the bits associated with each constellation point may be based on a mapping that is specific to the estimated communication impairments. For example, a standard specification may provide different mappings of bits to constellation points and a particular mapping may be defined for use in a system having a particular communication impairment (such as AWGN, phase noise, or non-linear distortion). In another example, the modulation scheme may be adapted by altering a standard mapping of bits to constellation points according to the estimated communication impairment.

Figure 8B:
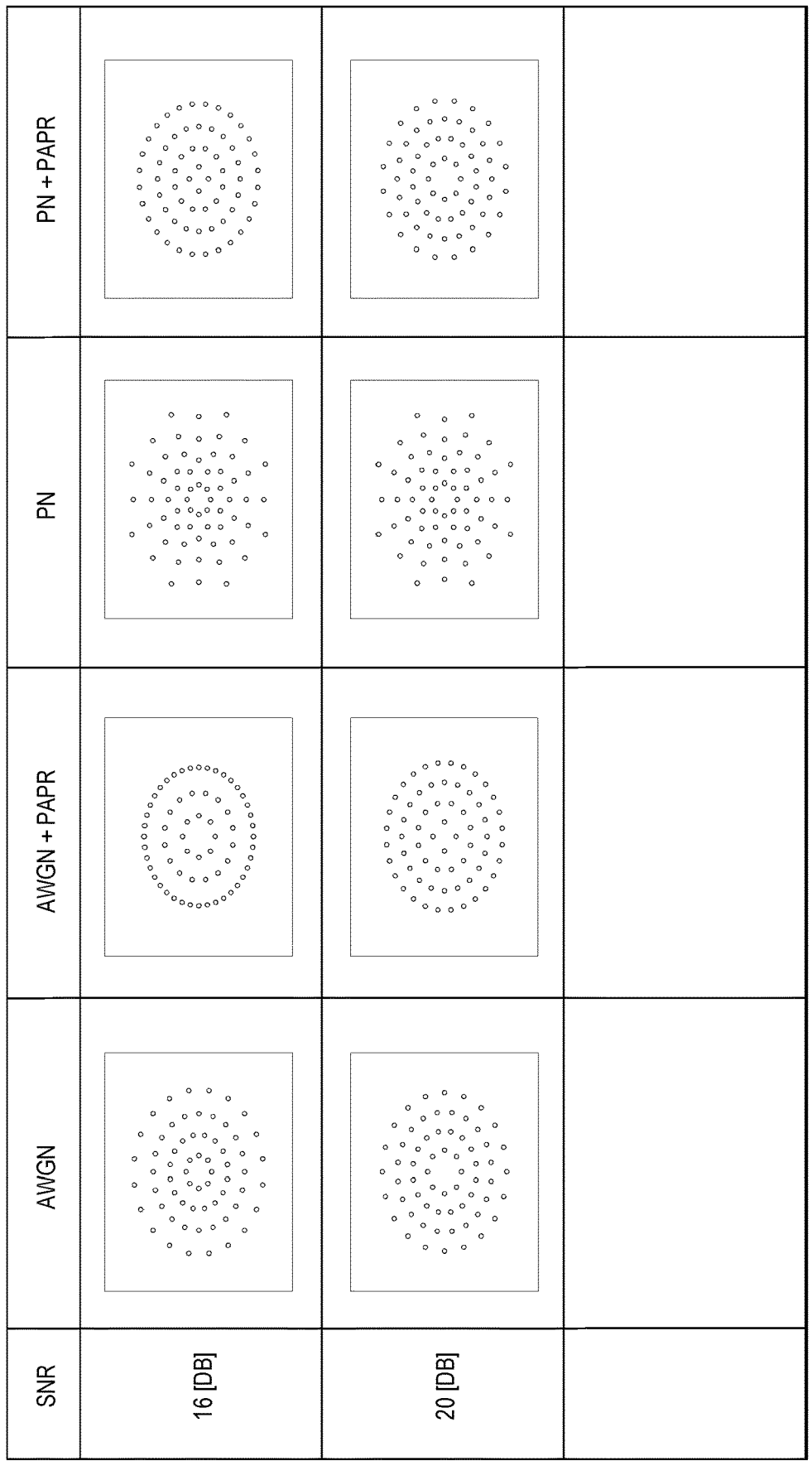
FIG. 8B shows example constellation configurations for a 64-APSK modulation scheme associated with different communication impairments.

FIG. 8B shows example constellation configurations 801 for a 64-APSK modulation scheme associated with different communication impairments. FIG. 8B is provided to illustrate how the constellation configuration may depend on which communication impairment is present. For example, comparing the constellation configuration associated with an AWGN communication impairment with the constellation configuration associated with a PN communication impairment, the quantity of rings, locations of constellation points, and spacing between constellation points are different.

Figure 8C:
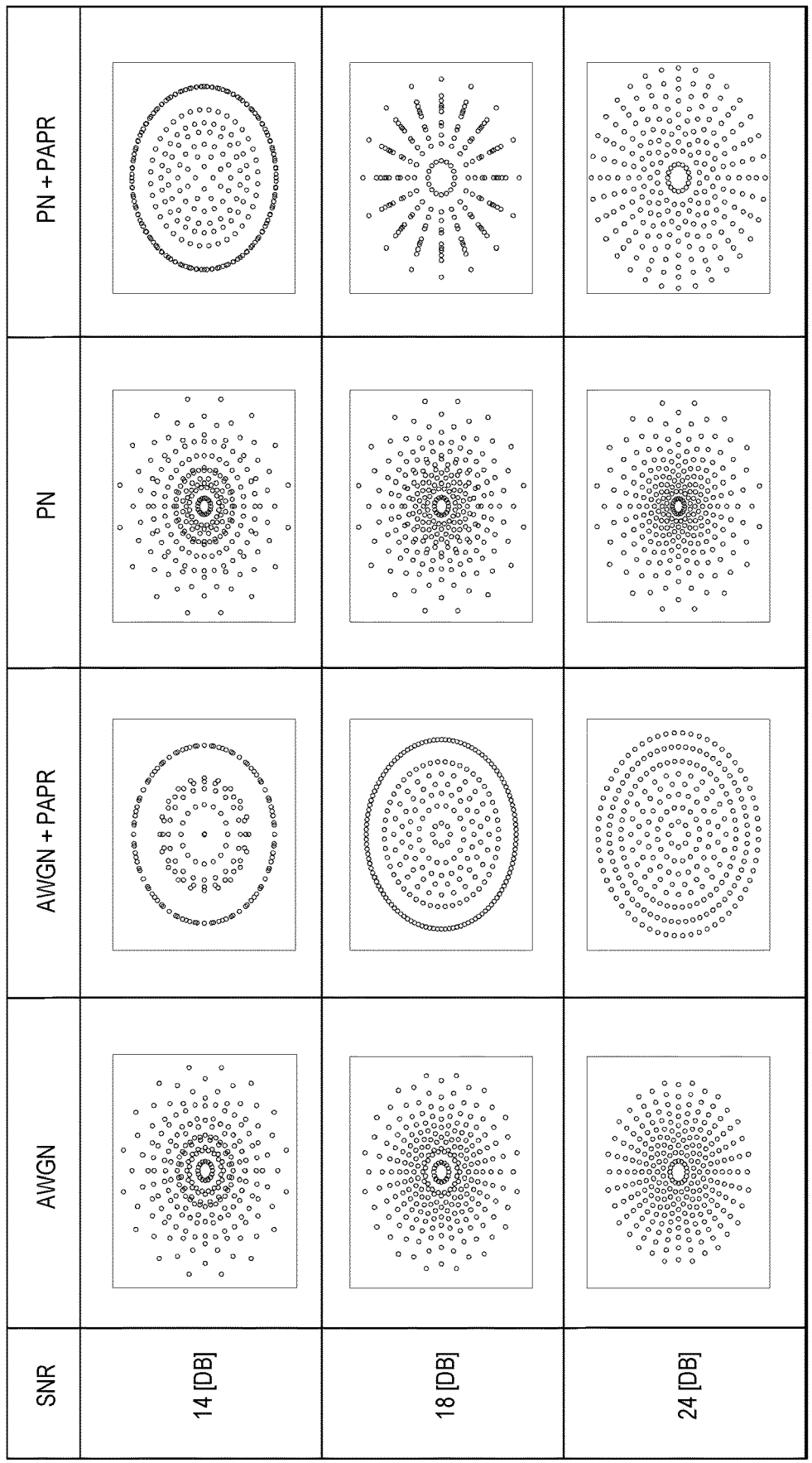
FIG. 8C shows example constellation configurations for a 256-APSK modulation scheme associated with different communication impairments.

FIG. 8C shows example constellation configurations 802 for a 256-APSK modulation scheme associated with different communication impairments. It is noted that the example constellation configurations 800, 801, and 802 of FIGS. 8A, 8B, and 8C are based on an output of an optimization application configured to generate various constellation configurations based on example communication impairments. For example, the optimization application may search for APSK parameters that will increase mutual information criteria under various SNR and PAPR constraints.

Figure 9:
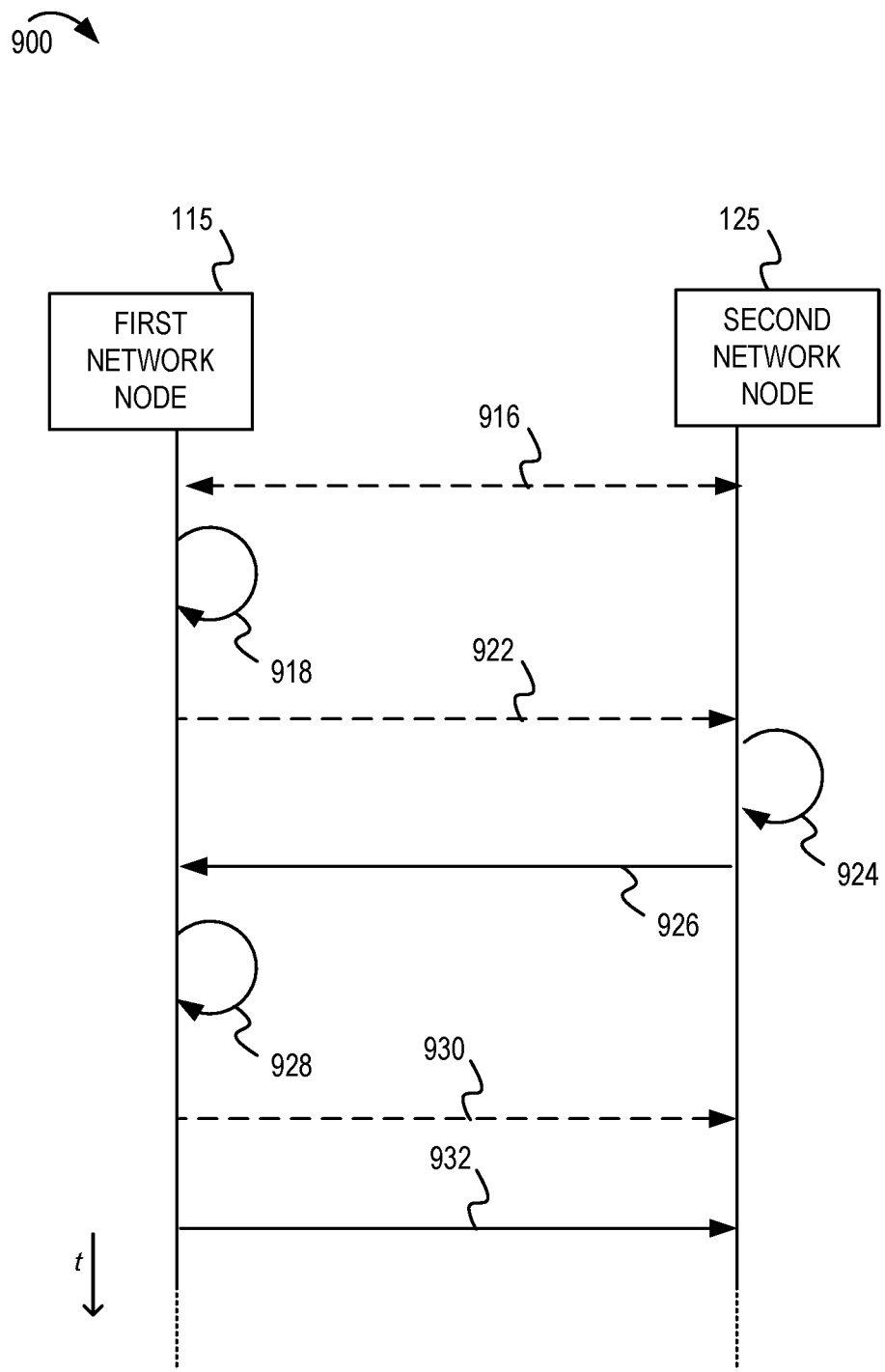
FIG. 9 shows an example message flow diagram in which an APSK modulation scheme is determined based on one or more communication impairments.

FIG. 9 shows an example message flow diagram 900 in which an APSK modulation scheme is determined based on one or more communication impairments. A first network node 115 (as "transmitter") may have a single-carrier waveform communication 932 to transmit to a second network node 125 (as "receiver"). Initially, shown at process 918, the first network node 115 may select an APSK modulation scheme (such as 16-APSK, 32-APSK, 64-APSK, among other examples). The APSK modulation scheme may be selected based on channel quality or other metrics associated with previous communications 916. However, as described herein, the first network node 115 may determine a constellation configuration for the selected APSK modulation scheme. In some aspects, the constellation configuration may include a constellation pattern or parameter associated with the selected APSK modulation scheme. In some aspects, the constellation configuration may include adaptions or adjustments to at least one constellation parameter associated with the selected APSK modulation scheme.

In some implementations, the first network node 115 may transmit an impairment estimation signal 922 to the second network node 125. For example, the impairment estimation signal 922 may include signals at various constellation points according to a predefined sequence to enable the second network node 125 to measure how the signals for the predefined sequence conform to a constellation pattern for a particular APSK modulation scheme. Shown as process 924, the second network node 125 may determine estimated communication impairments (either based on the impairment estimation signal 922 or the previous communications 916.

The second network node 125 may transmit control information 926 to the first network node 115. The control information 926 may be indicative of the estimated communication impairments. In some implementations, the control information 926 may indicate measurements (such as AWGN measurements, phase noise measurements, nonlinear distortion measurements). In some implementations, the control information 926 may indicate the presence of particular communication impairments (such as AWGN, phase noise, or nonlinear distortion), and optionally a metric indicating the degree of impairment associated with each communication impairment. In some implementations, the control information 926 may indicate suggested constellation parameters associated with the estimated communication impairments.

Shown at process 928, the first network node 115 may select one or more constellation parameters for the APSK modulation scheme based on the control information 926. In some implementations, the first network node 115 may transmit other control information 930 to indicate the selected constellation parameters for the APSK modulation scheme. It should be apparent that in some implementations the first network node 115 may adjust the constellation parameters without transmitting an indication of the selected constellation parameters, such as when the selected constellation parameters are intended to adjust for the estimated communication impairments without modifying a constellation pattern expected by the second network node 125. The first network node 115 may transmit the single-carrier waveform communication 932 based on (e.g., through use of) the selected APSK modulation scheme and the one or more selected constellation parameters.

Figure 10:
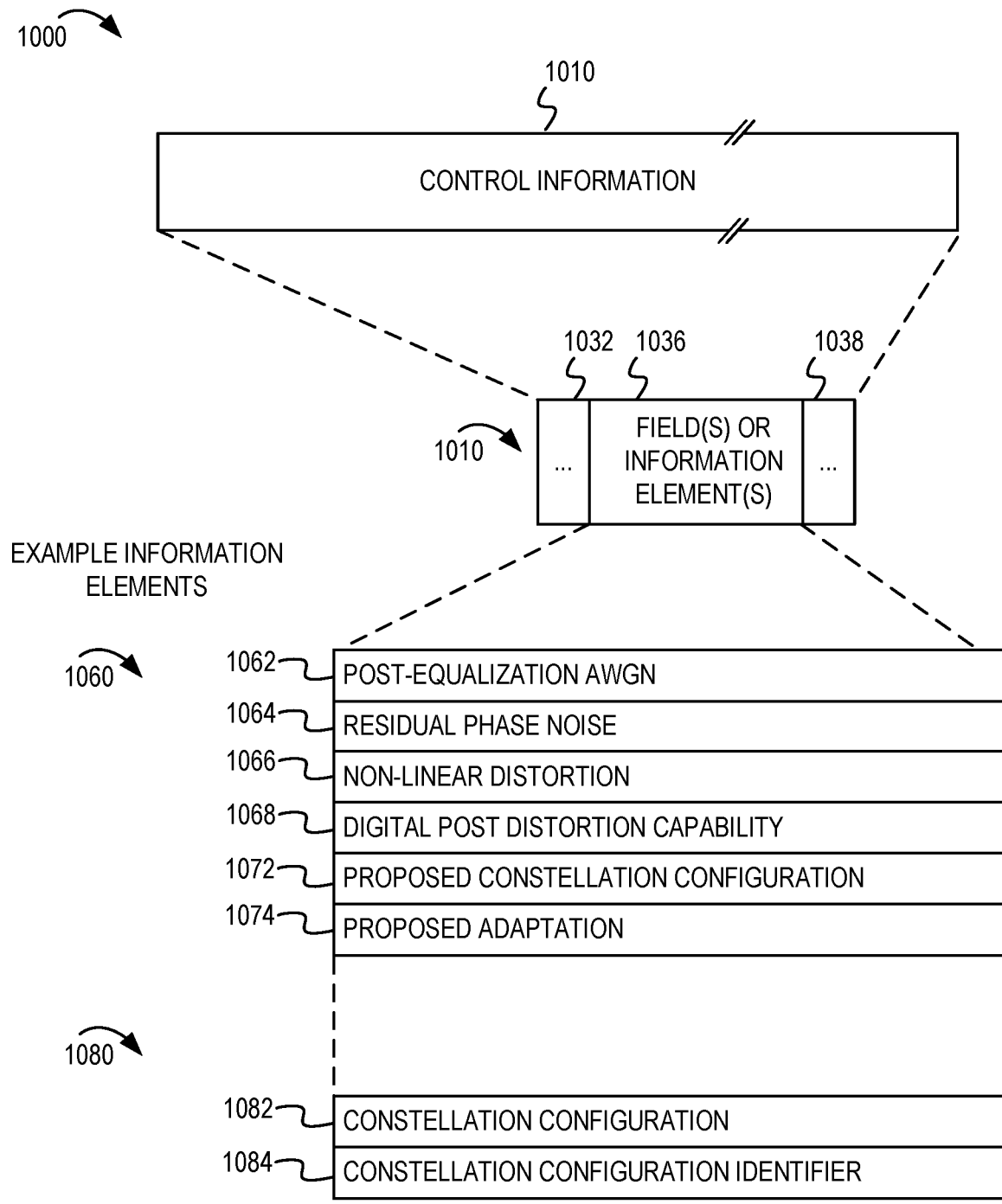
FIG. 10 depicts a message format with example control information elements.

FIG. 10 depicts a message format 1000 with example control information elements. The message format 1000 may be used as part of a message for DCI, UCI, MAC-CE, or RRC. The message format 1000 includes control information 1010. The control information 1000 described with reference to FIG. 10 may be sent from a first network node (such as first network node 115) to a second network node (such as second network node 125), or vice versa. The control information 1010 may be used to communicate about estimated communication impairments or selected constellation configurations associated therewith. The control information 1010 may be organized or formatted in a variety of ways. For example, the control information 1010 may include information elements 1032, 1036, and 1038. Several examples of information elements are illustrated in FIG. 10.

Example information elements 1060 may be sent from a receiver (such as the second network node 125 described with reference to FIGS. 3 and 9). In various implementations, the example information elements 1060 may include information indicating a post-equalization AWGN 1062, information indicating a residual PN 1064, information indicating nonlinear distortion 1066, information indicating DPoD capability 1068 of the receiver, a proposed constellation configuration 1072 (or part of a constellation configuration, such as a constellation pattern or a constellation parameter), information indicating a proposed adaptation 1074, or any combination thereof.

Example information elements 1080 may be sent from a transmitter (such as the first network node 115 described with reference to FIGS. 3 and 9). In various implementations, the example information elements 1080 may include a constellation configuration 1082 (or any part thereof), information indicating a selected constellation configuration (such as a constellation configuration identifier 1084), or any combination thereof.

FIG. 11 shows a flowchart illustrating an example process 1100 for wireless communication between a first network node and a second network node. The process 1100 may be performed by a first network node that supports adaptation of an APSK modulation scheme. In some implementations, the first network node may be configured to transmit a single-carrier waveform communication. For example, the first network node may be a base station 110, a UE 120, a network node 1300, a mobile communication device 1404, or a component thereof as described herein. In some implementations, the first network node may be a BS (such as the BS 110 described herein) and the second network node may be a UE (such as UE 120 described herein). In some implementations, the first network node or the second network node may be a component of a BS, such as a central unit (CU), a distributed unit (DU), or a radio unit (RU) implemented in a disaggregated RAN (D-RAN) or open RAN (O-RAN) configuration.

At block 1110, the first network node may determine, based on communication impairment information, a constellation configuration for an amplitude and phase shift keying (APSK) modulation scheme to be used for a transmission of a single-carrier waveform communication from the first network node to the second network node.

At block 1120, the first network node may cause the transmission, based on (e.g., through use of) the constellation configuration and the APSK modulation scheme, of the single-carrier waveform communication to the second network node.

FIG. 12 shows a flowchart illustrating another example process 1200 for wireless communication between a first network node and a second network node. The process 1200 may be performed by a second network node that supports adaptation of an APSK modulation scheme. In some implementations, the second network node may be a receiver of a single-carrier waveform communication from a first network node, such as a base station 110, a UE 120, a network node 1300, or a mobile communication device 1404 as described herein. In some implementations, the first network node may be a BS (such as the BS 110 described herein) and the second network node may be a UE (such as UE 120 described herein). In some implementations, the first network node or the second network node may be a component of a BS, such as a central unit (CU), a distributed unit (DU), or a radio unit (RU) implemented in a disaggregated RAN (D-RAN) or open RAN (O-RAN) configuration.

At block 1210, the second network node may determine, based on at least one communication impairment expected to impair a single-carrier waveform communication to be received from a second network node, a constellation configuration for an amplitude and phase shift keying (APSK) modulation scheme that the second network node will use for a transmission of the single-carrier waveform communication.

At block 1220, the second network node may transmit the constellation configuration to the second network node.

At block 1230, the second network node may receive, based on (e.g., through use of) the constellation configuration, the transmission of the single-carrier waveform communication from the second device.

Figure 13:
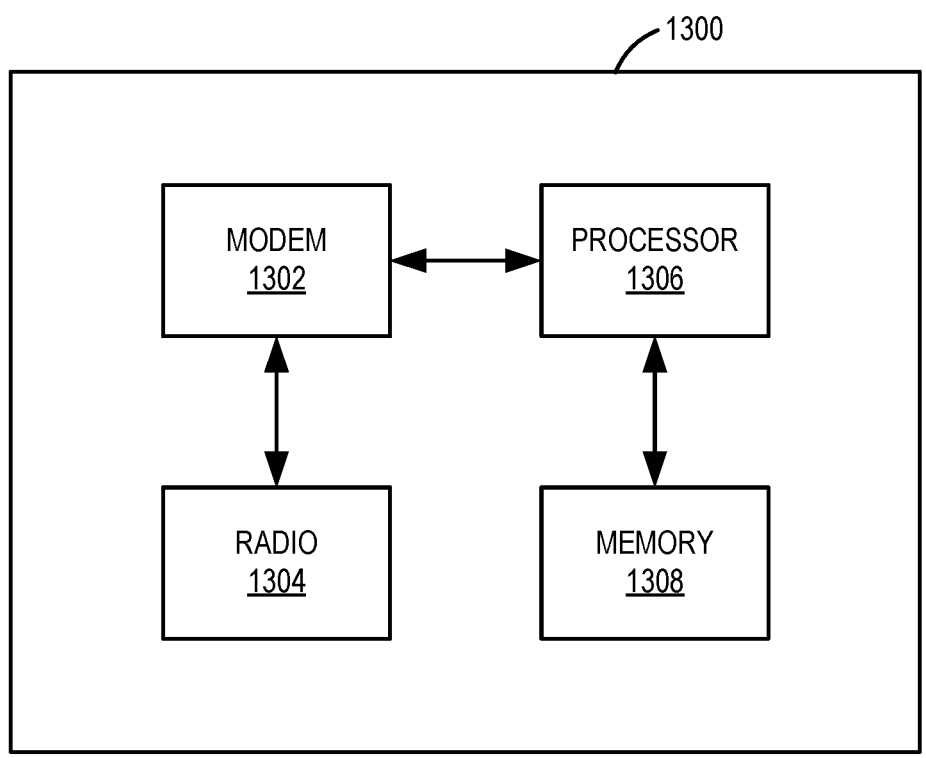
FIG. 13 shows a block diagram of an example network node.

FIG. 13 shows a block diagram of an example network node 1300. In some implementations, the network node 1300 can be an example of a device for use in a UE or a BS, such as the UE 120 or BS 110 described herein. In some implementations, the network node 1300 can be an example of a device for use in a BS or a UE. The network node 1300 is capable of transmitting (or outputting for transmission) and receiving wireless communications.

The network node 1300 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The network node 1300 may include one or more modems 1302. In some implementations, the one or more modems 1302 (collectively "the modem 1302") may include a WWAN modem (for example, a 3GPP 4G LTE or 5G compliant modem). In some implementations, the network node 1300 also includes one or more radios 1304 (collectively "the radio 1304"). In some implementations, the network node 1300 further includes one or more processors, processing blocks or processing elements (collectively "the processor 1306") and one or more memory blocks or elements (collectively "the memory 1308").

The modem 1302 can include an intelligent hardware block or device such as, for example, an application-specific integrated circuit (ASIC) among other possibilities. The modem 1302 is generally configured to implement a PHY layer. For example, the modem 1302 is configured to modulate packets and to output the modulated packets to the radio 1304 for transmission over the wireless medium. The modem 1302 is similarly configured to obtain modulated packets received by the radio 1304 and to demodulate the packets to provide demodulated packets. In addition to a modulator and a demodulator, the modem 1302 may further include digital signal processing (DSP) circuitry, automatic gain control (AGC), a coder, a decoder, a multiplexer and a demultiplexer. For example, while in a transmission mode, data obtained from the processor 1306 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1304. In implementations involving beamforming, the modulated symbols in the respective spatial streams are precoded via a steering matrix prior to their provision to the IFFT block.

While in a reception mode, digital signals received from the radio 1304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 1306) for processing, evaluation, or interpretation.

The radio 1304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the network node 1300 can include, or be coupled with, multiple transmit antennas (each with a corresponding transmit chain) and multiple receive antennas (each with a corresponding receive chain). The symbols output from the modem 1302 are provided to the radio 1304, which transmits the symbols via the coupled antennas. Similarly, symbols received via the antennas are obtained by the radio 1304, which provides the symbols to the modem 1302.

The processor 1306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1306 processes information received through the radio 1304 and the modem 1302, and processes information to be output through the modem 1302 and the radio 1304 for transmission through the wireless medium. In some implementations, the processor 1306 may generally control the modem 1302 to cause the modem to perform various operations described throughout.

The memory 1308 can include tangible storage media such as random-access memory (RAM) or read-only memory (ROM), or combinations thereof. The memory 1308 also can store non-transitory processor- or computer-executable software (SW) code containing instructions that, when executed by the processor 1306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 1306 and the memory 1308 of the network node 1300 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 1306, the memory 1308, and one or more other components of the network node 1300, such as the modem 1302.

In some implementations, the processing system of a UE 120 may interface with other components of the UE 120, and may process information received from other components (such as inputs or signals), output information to other components, etc. For example, a chip or modem of the UE 120 (such as the network node 1300) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the network node 1300) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

In some aspects, at least one processor (such as processor 1306) may include at least one modem (such as modem 1302). In such aspects, to cause transmission of the single-carrier waveform communication to the second network node, the at least one processor may be configured to cause the at least one modem to transmit the single-carrier waveform communication to the second communication.

In some aspects, the at least one processor may be communicatively coupled to at least one modem. In such aspects, to cause transmission of the single-carrier waveform communication to the second communication, the at least one processor may be configured to cause the at least one modem to transmit the single-carrier waveform communication to the second communication.

Figure 14:
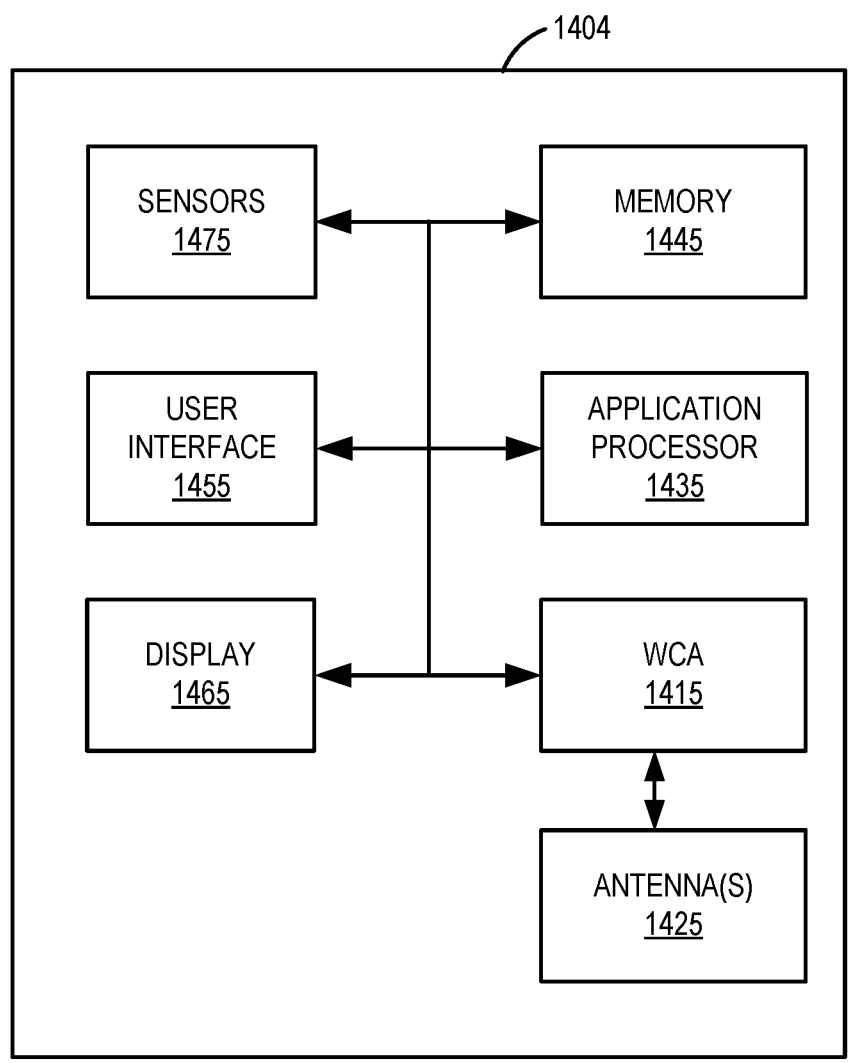
FIG. 14 shows a block diagram of an example mobile communication device.

FIG. 14 shows a block diagram of an example mobile communication device 1404. For example, the mobile communication device 1404 can be an example implementation of the UE 120 described herein. The mobile communication device 1404 includes a wireless communication apparatus (WCA) 1415. For example, the WCA 1415 may be an example implementation of the network node 1300 described with reference to FIG. 13. The mobile communication device 1404 also includes one or more antennas 1425 coupled with the WCA 1415 to transmit and receive wireless communications. The mobile communication device 1404 additionally includes an application processor 1435 coupled with the WCA 1415, and a memory 1445 coupled with the application processor 1435. In some implementations, the mobile communication device 1404 further includes a UI 1455 (such as a touchscreen or keypad) and a display 1465, which may be integrated with the UI 1455 to form a touchscreen display. In some implementations, the mobile communication device 1404 may further include one or more sensors 1475 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1404 further includes a housing that encompasses the WCA 1415, the application processor 1435, the memory 1445, and at least portions of the antennas 1425, UI 1455, and display 1465.

FIGS. 1-14 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as example aspects for clarity).

Example Aspects

Example aspect 1. A first network node for wireless communication, including: a memory; and at least one processor communicatively coupled to the memory, where the at least one processor is configured to: determine, based on communication impairment information, a constellation configuration for an amplitude and phase shift keying (APSK) modulation scheme to be used for a transmission of a single-carrier waveform communication from the first network node to a second network node; and cause the transmission, based on the constellation configuration and the APSK modulation scheme, of the single-carrier waveform communication to the second network node.

Example aspect 2. The first network node of example aspect 1, where the communication impairment information is indicative of at least one communication impairment expected to impair the single-carrier waveform communication, and where the constellation configuration includes at least one of a constellation parameter or a constellation pattern for the APSK modulation scheme such that the constellation parameter or the constellation pattern is associated with the at least one communication impairment.

Example aspect 3. The first network node of example aspect 1, where the communication impairment information is indicative of one or more communication impairments including at least one of: additive white gaussian noise (AWGN), phase noise, or non-linear distortion.

Example aspect 4. The first network node of example aspect 1, where the constellation configuration includes a setting for at least one of: a quantity of rings in a constellation pattern associated with the APSK modulation scheme, a quantity of constellation points associated with one or more rings in the constellation pattern, a ring radius or an offset to the ring radius associated with one or more rings in the constellation pattern, or a phase offset to one or more rings in the constellation pattern.

Example aspect 5. The first network node of example aspect 1, where the constellation configuration includes a constellation mapping of each respective constellation point of a plurality of constellation points in the APSK modulation scheme to a respective value of a plurality of values, where each respective value of the plurality of values represents a respective plurality of data bits, and where the constellation mapping is based on at least one communication impairment.

Example aspect 6. The first network node of example aspect 1, where the at least one processor is further configured to: determine channel conditions; and determine the communication impairment information based on the channel conditions.

Example aspect 7. The first network node of example aspect 1, where the at least one processor is further configured to: obtain, from the second network node, the communication impairment information, where the communication impairment information includes information indicative of the constellation configuration based on one or more communication impairments expected to impair the single-carrier waveform communication.

Example aspect 8. The first network node of example aspect 7, where the at least one processor is further configured to: obtain the communication impairment information from the second network node in a downlink control information (DCI) message, an uplink control information (UCI) message, a medium access control (MAC) control element (MAC-CE), or a radio resource control (RRC) message.

Example aspect 9. The first network node of example aspect 1, where the at least one processor is further configured to: output an impairment estimation signal to the second network node, where the impairment estimation signal enables the second network node to measure one or more communication impairments that impair the impairment estimation signal; and obtain, after transmission of the impairment estimation signal to the second network node, the communication impairment information from the second network node.

Example aspect 10. The first network node of example aspect 9, where the communication impairment information is indicative of at least one communication impairment including: a post-equalization additive white gaussian noise (AWGN) associated with the impairment estimation signal at the second network node, a residual phase noise (PN) associated with the impairment estimation signal at the second network node, or a non-linear distortion associated with the impairment estimation signal at the second network node.

Example aspect 11. The first network node of example aspect 1, where the at least one processor is further configured to: determine the constellation configuration based on whether the second network node is configured with a digital post distortion (DPoD) capability.

Example aspect 12. The first network node of example aspect 1, where the at least one processor is further configured to select the constellation configuration from among a plurality of constellation configurations, where each respective constellation configuration is associated with a respective one or more communication impairments.

Example aspect 13. The first network node of example aspect 1, where the constellation configuration includes at least one of a constellation parameter, a constellation mapping, or a constellation pattern based on the communication impairment information.

Example aspect 14. The first network node of example aspect 1, where the communication impairment information includes information indicative of a plurality of communication impairments, and where the at least one processor is further configured to determine the constellation configuration based on one or more communication impairments of the plurality of communication impairments.

Example aspect 15. The first network node of example aspect 1, where the at least one processor is further configured to: indicate the constellation configuration in a message to the second network node prior to causing the transmission of the single-carrier waveform communication.

Example aspect 16. A first network node for wireless communication, including: a memory; and at least one processor communicatively coupled to the memory, where the at least one processor is configured to: determine, based on at least one communication impairment expected to impair a single-carrier waveform communication to be received from a second network node, a constellation configuration for an amplitude and phase shift keying (APSK) modulation scheme that the second network node will use for a transmission of the single-carrier waveform communication; output the constellation configuration in a control message to the second network node; and cause reception, based on the constellation configuration, of the transmission of the single-carrier waveform communication from the second network node.

Example aspect 17. The first network node of example aspect 16, where the constellation configuration includes at least one of a constellation parameter or a constellation pattern for the APSK modulation scheme such that the constellation parameter or the constellation pattern is associated with the at least one communication impairment including: additive white gaussian noise (AWGN), phase noise, or non-linear distortion.

Example aspect 18. The first network node of example aspect 16, where the constellation configuration includes a setting for at least one of: a quantity of rings in a constellation pattern associated with the APSK modulation scheme, a quantity of constellation points associated with one or more rings in the constellation pattern, a ring radius or an offset to the ring radius associated with one or more rings in the constellation pattern, a phase offset to one or more rings in the constellation pattern, or a constellation mapping of each respective constellation point of a plurality of constellation points in the APSK modulation scheme to a respective value of a plurality of values, where each respective value of the plurality of values represents a respective plurality of data bits.

Example aspect 19. The first network node of example aspect 16, where the at least one processor is further configured to: obtain an impairment estimation signal from the second network node; measure one or more communication impairments that impair the impairment estimation signal; and determine the constellation configuration based on the one or more communication impairments.

Example aspect 20. The first network node of example aspect 19, where the one or more communication impairments include: a post-equalization additive white gaussian noise (AWGN) associated with the impairment estimation signal as received by the first network node, a residual phase noise (PN) associated with the impairment estimation signal as received by the first network node, or a non-linear distortion associated with the impairment estimation signal as received by the first network node.

Example aspect 21. The first network node of example aspect 16, where the at least one processor is further configured to: determine the at least one communication impairment expected to impair the single-carrier waveform communication based on channel conditions.

Example aspect 22. The first network node of example aspect 16, where the at least one processor is further configured to: determine the constellation configuration based on whether the first network node uses DPoD capability.

Example aspect 23. A method performed by a first network node for wireless communication, including: determining, based on communication impairment information, a constellation configuration for an amplitude and phase shift keying (APSK) modulation scheme to be used for a transmission of a single-carrier waveform communication from the first network node to a second network node; and causing the transmission, using the constellation configuration and the APSK modulation scheme, of the single-carrier waveform communication to the second network node.

Example aspect 24. The method of example aspect 23, where the communication impairment information is indicative of at least one communication impairment expected to impair the single-carrier waveform communication, and where the constellation configuration includes at least one of a constellation parameter or a constellation pattern for the APSK modulation scheme such that the constellation parameter or the constellation pattern is associated with the at least one communication impairment.

Example aspect 25. The method of example aspect 23, where the communication impairment information is indicative of one or more communication impairments including at least one of: additive white gaussian noise (AWGN), phase noise, or non-linear distortion.

Example aspect 26. The method of example aspect 23, where the constellation configuration includes a setting for at least one of: a quantity of rings in a constellation pattern associated with the APSK modulation scheme, a quantity of constellation points associated with one or more rings in the constellation pattern, a ring radius or an offset to the ring radius associated with one or more rings in the constellation pattern, a phase offset to one or more rings in the constellation pattern, or a constellation mapping of each respective constellation point of a plurality of constellation points in the APSK modulation scheme to a respective value of a plurality of values, where each respective value of the plurality of values represents a respective plurality of data bits.

Example aspect 27. The method of example aspect 23, further including: transmitting an impairment estimation signal to the second network node, where the impairment estimation signal enables the second network node to measure one or more communication impairments that impair the impairment estimation signal; and receiving, after transmission of the impairment estimation signal to the second network node, the communication impairment information from the second network node.

Example aspect 28. The method of example aspect 23, where determining the constellation configuration includes: selecting the constellation configuration from among a plurality of constellation configurations, where each respective constellation configuration is associated with a respective one or more communication impairments.

Example aspect 29. A method performed by a first network node for wireless communication, including: determining, based on at least one communication impairment expected to impair a single-carrier waveform communication to be received from a second network node, a constellation configuration for an amplitude and phase shift keying (APSK) modulation scheme that the second network node will use for a transmission of the single-carrier waveform communication; transmitting the constellation configuration to the second network node; and receiving, using the constellation configuration, the transmission of the single-carrier waveform communication from the second network node.

Example aspect 30. The method of example aspect 29, where the constellation configuration includes at least one of a constellation parameter or a constellation pattern for the APSK modulation scheme such that the constellation parameter or the constellation pattern is associated with the at least one communication impairment including: additive white gaussian noise (AWGN), phase noise, or non-linear distortion; and where the constellation configuration includes a setting for at least one of: a quantity of rings in a constellation pattern associated with the APSK modulation scheme, a quantity of constellation points associated with one or more rings in the constellation pattern, a ring radius or an offset to the ring radius associated with one or more rings in the constellation pattern, a phase offset to one or more rings in the constellation pattern, or a constellation mapping of each respective constellation point of a plurality of constellation points in the APSK modulation scheme to a respective value of a plurality of values, where each respective value of the plurality of values represents a respective plurality of data bits.

Another innovative aspect of the subject matter described in this disclosure can be implemented as an apparatus. The apparatus may include a modem and at least one processor communicatively coupled with the at least one modem. The processor, in conjunction with the modem, may be configured to perform any one of the above-mentioned methods or features described herein.

Another innovative aspect of the subject matter described in this disclosure can be implemented as a computer-readable medium having stored therein instructions which, when executed by a processor, causes the processor to perform any one of the above-mentioned methods or features described herein.

Another innovative aspect of the subject matter described in this disclosure can be implemented as a system having means for implementing any one of the above-mentioned methods or features described herein.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A first network node for wireless communication, comprising:
a memory; and
at least one processor coupled to the memory, wherein the at least one processor is configured to:
determine, based on communication impairment information and based on whether a second network node is configured with a digital post distortion (DPOD) capability, a constellation configuration for an amplitude and phase shift keying (APSK) modulation scheme to be used for a transmission of a single-carrier waveform communication from the first network node to the second network node; and
cause the transmission, based on the constellation configuration and the APSK modulation scheme, of the single-carrier waveform communication to the second network node.

2. The first network node of claim 1,
wherein the communication impairment information is indicative of at least one communication impairment expected to impair the single-carrier waveform communication, and
wherein the constellation configuration includes at least one of a constellation parameter or a constellation pattern for the APSK modulation scheme such that the constellation parameter or the constellation pattern is associated with the at least one communication impairment.

3. The first network node of claim 1, wherein the communication impairment information is indicative of one or more communication impairments including at least one of:
additive white gaussian noise (AWGN),
phase noise, or
non-linear distortion.

4. The first network node of claim 1, wherein the constellation configuration includes a setting for at least one of:
a quantity of rings in a constellation pattern associated with the APSK modulation scheme,
a quantity of constellation points associated with one or more rings in the constellation pattern,
a ring radius or an offset to the ring radius associated with one or more rings in the constellation pattern, or
a phase offset to one or more rings in the constellation pattern.

5. The first network node of claim 1, wherein the constellation configuration includes a constellation mapping of each respective constellation point of a plurality of constellation points in the APSK modulation scheme to a respective value of a plurality of values, wherein each respective value of the plurality of values represents a respective plurality of data bits, and wherein the constellation mapping is based on at least one communication impairment.

6. The first network node of claim 1, wherein the at least one processor is further configured to:
determine channel conditions; and
determine the communication impairment information based on the channel conditions.

7. A first network node for wireless communication, comprising:
a memory; and
at least one processor coupled to the memory, wherein the at least one processor is configured to:
obtain, from a second network node, communication impairment information;
determine, based on the communication impairment information, a constellation configuration for an amplitude and phase shift keying (APSK) modulation scheme to be used for a transmission of a single-carrier waveform communication from the first network node to the second network node, wherein the communication impairment information includes information indicative of the constellation configuration based on one or more communication impairments expected to impair the single-carrier waveform communication; and
cause the transmission, based on the constellation configuration and the APSK modulation scheme, of the single-carrier waveform communication to the second network node.

8. The first network node of claim 7, wherein, to obtain the communication impairment information from the second network node, the at least one processor is configured to:
obtain, from the second network node, a message including the communication impairment information, wherein the message is a downlink control information (DCI) message, an uplink control information (UCI) message, a medium access control (MAC) control element (MAC-CE), or a radio resource control (RRC) message.

9. A first network node for wireless communication, comprising:
a memory; and
at least one processor coupled to the memory, wherein the at least one processor is configured to:
output an impairment estimation signal to a second network node, wherein the impairment estimation signal enables the second network node to measure one or more communication impairments that impair the impairment estimation signal;
obtain, after the impairment estimation signal is output to the second network node, communication impairment information from the second network node;
determine, based on the communication impairment information, a constellation configuration for an amplitude and phase shift keying (APSK) modulation scheme to be used for a transmission of a single-carrier waveform communication from the first network node to the second network node; and
cause the transmission, based on the constellation configuration and the APSK modulation scheme, of the single-carrier waveform communication to the second network node.

10. The first network node of claim 9, wherein the communication impairment information is indicative of at least one communication impairment including:
a post-equalization additive white gaussian noise (AWGN) associated with the impairment estimation signal at the second network node, a residual phase noise (PN) associated with the impairment estimation signal at the second network node, or a non-linear distortion associated with the impairment estimation signal at the second network node.

11. The first network node of claim 1, wherein, to determine the constellation configuration, the at least one processor is configured to select the constellation configuration from among a plurality of constellation configurations, wherein each respective constellation configuration is associated with a respective one or more communication impairments.

12. The first network node of claim 1,
wherein the constellation configuration includes at least one of a constellation parameter, a constellation mapping, or a constellation pattern.

13. The first network node of claim 1, wherein the communication impairment information includes information indicative of a plurality of communication impairments, and wherein the at least one processor is further configured to
determine the constellation configuration based on one or more communication impairments of the plurality of communication impairments.

14. The first network node of claim 1, wherein the at least one processor is further configured to:
indicate the constellation configuration in a message to the second network node prior to causing the transmission of the single-carrier waveform communication.

15. A first network node for wireless communication, comprising:
a memory; and
at least one processor coupled to the memory, wherein the at least one processor is configured to:
determine, based on at least one communication impairment expected to impair a single-carrier waveform communication to be received from a second network node, a constellation configuration for an amplitude and phase shift keying (APSK) modulation scheme that the second network node will use for a transmission of the single-carrier waveform communication;
output the constellation configuration in a control message to the second network node; and
cause reception, based on the constellation configuration, of the transmission of the single-carrier waveform communication from the second network node.

16. The first network node of claim 15,
wherein the constellation configuration includes at least one of a constellation parameter or a constellation pattern for the APSK modulation scheme such that the constellation parameter or the constellation pattern is associated with the at least one communication impairment including:
additive white gaussian noise (AWGN),
phase noise, or
non-linear distortion.

17. The first network node of claim 15, wherein the constellation configuration includes a setting for at least one of:
a quantity of rings in a constellation pattern associated with the APSK modulation scheme,
a quantity of constellation points associated with one or more rings in the constellation pattern,
a ring radius or an offset to the ring radius associated with one or more rings in the constellation pattern,
a phase offset to one or more rings in the constellation pattern, or a constellation mapping of each respective constellation point of a plurality of constellation points in the APSK modulation scheme to a respective value of a plurality of values, wherein each respective value of the plurality of values represents a respective plurality of data bits.

18. The first network node of claim 15, wherein the at least one processor is further configured to:
obtain an impairment estimation signal from the second network node;
measure one or more communication impairments that impair the impairment estimation signal; and
determine the constellation configuration based on the one or more communication impairments.

19. The first network node of claim 18, wherein the one or more communication impairments include:
a post-equalization additive white gaussian noise (AWGN) associated with the impairment estimation signal as received by the first network node,
a residual phase noise (PN) associated with the impairment estimation signal as received by the first network node, or
a non-linear distortion associated with the impairment estimation signal as received by the first network node.

20. The first network node of claim 15, wherein the at least one processor is further configured to:
determine the at least one communication impairment expected to impair the single-carrier waveform communication based on channel conditions.

21. The first network node of claim 15, wherein the at least one processor is further configured to:
determine the constellation configuration based on whether the first network node uses DPOD capability.

22. A method performed by a first network node for wireless communication, comprising:
transmitting an impairment estimation signal to s second network node, wherein the impairment estimation signal enables the second network node to measure one or more communication impairments that impair the impairment estimation signal;
receiving, after transmission of the impairment estimation signal to the second network node, communication impairment information from the second network node;
determining, based on the communication impairment information, a constellation configuration for an amplitude and phase shift keying (APSK) modulation scheme to be used for a transmission of a single-carrier waveform communication from the first network node to the second network node; and
causing the transmission, using the constellation configuration and the APSK modulation scheme, of the single-carrier waveform communication to the second network node.

23. The method of claim 22,
wherein the communication impairment information is indicative of at least one communication impairment expected to impair the single-carrier waveform communication, and
wherein the constellation configuration includes at least one of a constellation parameter or a constellation pattern for the APSK modulation scheme such that the constellation parameter or the constellation pattern is associated with the at least one communication impairment.

24. The method of claim 22, wherein the communication impairment information is indicative of one or more communication impairments including at least one of:
additive white gaussian noise (AWGN), phase noise, or non-linear distortion.

25. The method of claim 22, wherein the constellation configuration includes a setting for at least one of:
  a quantity of rings in a constellation pattern associated with the APSK modulation scheme,
  a quantity of constellation points associated with one or more rings in the constellation pattern,
  a ring radius or an offset to the ring radius associated with one or more rings in the constellation pattern,
  a phase offset to one or more rings in the constellation pattern, or
  a constellation mapping of each respective constellation point of a plurality of constellation points in the APSK modulation scheme to a respective value of a plurality of values, wherein each respective value of the plurality of values represents a respective plurality of data bits.

26. The method of claim 22, wherein determining the constellation configuration includes:
  selecting the constellation configuration from among a plurality of constellation configurations, wherein each respective constellation configuration is associated with a respective one or more communication impairments.

27. A method performed by a first network node for wireless communication, comprising:
  determining, based on at least one communication impairment expected to impair a single-carrier waveform communication to be received from a second network node, a constellation configuration for an amplitude and phase shift keying (APSK) modulation scheme that the second network node will use for a transmission of the single-carrier waveform communication;
  transmitting the constellation configuration to the second network node; and
  receiving, using the constellation configuration, the transmission of the single-carrier waveform communication from the second network node.

28. The method of claim 27,
  wherein the constellation configuration includes at least one of a constellation parameter or a constellation pattern for the APSK modulation scheme such that the constellation parameter or the constellation pattern is associated with the at least one communication impairment including:
    additive white gaussian noise (AWGN),
    phase noise, or
    non-linear distortion; and
  wherein the constellation configuration includes a setting for at least one of:
    a quantity of rings in the constellation pattern associated with the APSK modulation scheme,
    a quantity of constellation points associated with one or more rings in the constellation pattern,
    a ring radius or an offset to the ring radius associated with one or more rings in the constellation pattern,
    a phase offset to one or more rings in the constellation pattern, or
    a constellation mapping of each respective constellation point of a plurality of constellation points in the APSK modulation scheme to a respective value of a plurality of values, wherein each respective value of the plurality of values represents a respective plurality of data bits.

29. The method of claim 27, further comprising:
  receiving an impairment estimation signal from the second network node;
  measuring one or more communication impairments that impair the impairment estimation signal; and
  determining the constellation configuration based on the one or more communication impairments.

30. The method of claim 29, wherein the one or more communication impairments include:
  a post-equalization additive white gaussian noise (AWGN) associated with the impairment estimation signal as received by the first network node,
  a residual phase noise (PN) associated with the impairment estimation signal as received by the first network node, or
  a non-linear distortion associated with the impairment estimation signal as received by the first network node.

31. The method of claim 27, further comprising:
  determining the at least one communication impairment expected to impair the single-carrier waveform communication based on channel conditions.

32. The method of claim 27, further comprising:
  Determining the constellation configuration based on whether the first network node uses DPOD capability.

* * * * *